United States Patent
Choi et al.

(10) Patent No.: US 12,393,582 B2
(45) Date of Patent: Aug. 19, 2025

(54) AUTOMATIC RECOMPILATION FOR PARAMETERIZED QUERIES

(71) Applicant: SAP SE, Walldorf (DE)

(72) Inventors: Dalsu Choi, Seoul (KR); Sanghee Lee, Seoul (KR); Mijin An, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/428,595

(22) Filed: Jan. 31, 2024

(65) Prior Publication Data

US 2025/0245225 A1   Jul. 31, 2025

(51) Int. Cl.
*G06F 16/2453* (2019.01)

(52) U.S. Cl.
CPC .. *G06F 16/24542* (2019.01); *G06F 16/24539* (2019.01); *G06F 16/24549* (2019.01)

(58) Field of Classification Search
None
See application file for complete search history.

(56) References Cited

U.S. PATENT DOCUMENTS

| | | | |
|---|---|---|---|
| 7,933,894 B2 * | 4/2011 | Friedman | G06F 16/24542 707/718 |
| 11,188,538 B2 | 11/2021 | Sinclair et al. | |
| 11,461,327 B1 | 10/2022 | Cruanes et al. | |
| 2013/0318069 A1 | 11/2013 | Aluc et al. | |
| 2017/0161325 A1 * | 6/2017 | Rastogi | G06F 16/24542 |
| 2018/0329955 A1 * | 11/2018 | Chaudhuri | G06F 16/24545 |
| 2020/0210429 A1 * | 7/2020 | Sinclair | G06F 16/24542 |
| 2024/0362222 A1 * | 10/2024 | Cui | G06F 16/24528 |

OTHER PUBLICATIONS

Eskandar, "Exploring Common Distance Measures for Machine Learning and Data Science: A Comparative Analysis," https://medium.com/@eskandar.sahel/exploring-common-distance-measure-for-machine-learning-and-data-science-a-comparative-analysis-ca0216c93ba3, 18 pages (accessed Dec. 11, 2023).
Anand, "Gower's Distance," *Analytics Vidhya*, https://medium.com/analytics-3, 15 pages, Jun. 17, 2020.
Extended European Search Report, European Patent Application No. 24214680.1, 16 pages, Apr. 22, 2025.

* cited by examiner

*Primary Examiner* — Tony Mahmoudi
*Assistant Examiner* — Umar Mian
(74) *Attorney, Agent, or Firm* — Klarquist Sparkman, LLP

(57) ABSTRACT

A computer-implemented method can receive a parameterized query with an input parameter set, wherein the parameterized query has a query plan stored in a plan cache, determine an estimated compilation-plus-execution time for compiling and executing the parameterized query with the input parameter set based on a compilation history associated with the parameterized query, determine an estimated execution time for executing the parameterized query with the input parameter set by using the query plan based on an execution history associated with the query plan, and determine a cache gain based at least in part on the estimated compilation-plus-execution time and the estimated execution time. Responsive to finding that the cache gain is positive, the method can execute the parameterized query with the input parameter set by using the query plan. Otherwise, the method can compile and execute the parameterized query with the input parameter set.

18 Claims, 12 Drawing Sheets

AUTOMATIC RECOMPILATION FOR PARAMETERIZED QUERIES

BACKGROUND

A query plan (also referred to as "query execution plan") is a sequence of steps that a database management system (DBMS) executes in order to complete a query. When a query is run for the first time in the DBMS, the query can be compiled by a query optimizer to generate a corresponding query plan, which can be stored in memory called query plan cache, or simply plan cache. A query plan stored in the plan cache can also be referred to as a cached query plan, or simply cached plan. Thus, when the same query is run again, the DBMS does not need to regenerate the query plan. Instead, it can reuse the cached query plan stored in the query plan cache, thereby improving efficiency of the DBMS.

Query optimization refers to the overall process of attempting to choose a most efficient query plan, among many candidate query plans, to execute a query. In this context, a parameterized query, which uses placeholders for parameters with values supplied at query runtime, can be beneficial. It allows DBMS to cache the query plan, thereby avoiding the need for repetitive query compilations and enhancing performance. However, query optimization for parameterized queries may not always provide the expected results. Thus, room for improvements exists for processing parameterized queries.

DETAILED DESCRIPTION

Overview of Parameterized Query Optimization

Figure 1:
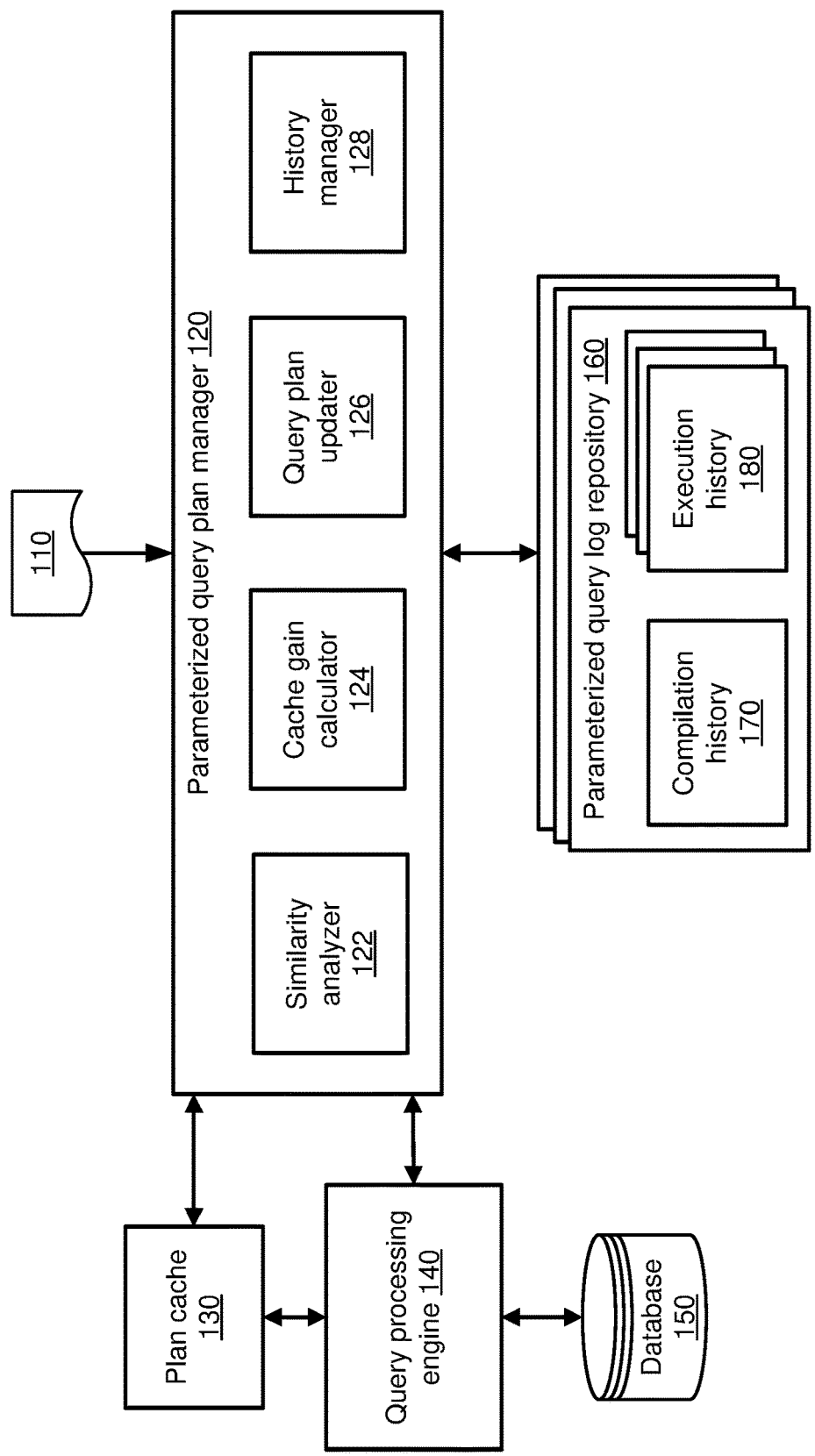
FIG. 1 is an overall block diagram of an example runtime parameterized query management system.

As described herein, query optimization refers to the overall process of attempting to choose a most efficient query plan, among many candidate query plans, to execute a query. In practice, although the terms "optimal" and "optimize" are used, the actual best query plan may not be selected, but the selected query plan is deemed better than others based on data available to a query optimizer in a query processing engine.

As described herein, query compilation refers to the process of converting an incoming query to a query plan. Depending on the complexity of the query (e.g., the number of joined tables, etc.) and the query optimization algorithm, query compilation time can be long (e.g., tens of seconds or more). Thus, to improve operational efficiency, the compiled query plan (e.g., the determined most optimal query plan) corresponding to the incoming query can be stored in a plan cache so that it can be quickly retrieved and reused if the same query is submitted again in the future.

Query optimization can also be applied to parameterized queries. A parameterized query is a type of structured query language (SQL) query which allows placing parameter(s) in a query statement serving as placeholder(s). Each parameter can take its value (e.g., in a separate statement) when the parameterized query is executed, which allows the parameterized query to be reused with different values and for different purposes. A parameterized query can have multiple parameterized predicates, thus allowing multiple parameters to have their values assigned during query execution. As described herein, a set of parameter values for a parameterized query can also be referred to as a parameter set. The parameter values in a parameter set can have a variety of data formats, such as integer, float, string, Boolean, date, time, etc.

There are several benefits of using parameterized queries. Generally, parameterized queries are more readable than non-parameterized queries. Parameterized queries can be prepared in advance and then reused for similar applications without having to create distinct SQL queries for each case, thus avoiding repetitive query compilations, which can consume a lot of computing resources. Parameterized queries can also be used for security reasons. For example, parameterized queries can be used to mitigate or avoid so-called SQL injection attacks which can result in unauthorized access to sensitive data.

However, query optimization for parameterized queries may not always provide the expected results as the values for query parameters may not be provided until the query execution time. Further, the performance of a cached plan for a parameterized query can fluctuate based on the input parameters. For example, when a parameterized query is executed with a certain set of input parameters, the cached plan may yield excellent performance due to the optimization of the query plan based on those specific parameters. However, if the input parameters change, the same cached plan may not be as efficient. This is because the cached plan was optimized based on the initial parameters, which may not be optimal for different parameters. Consequently, reusing the same cached plan with different input parameters could result in sub-optimal performance.

The technical challenge in determining whether to use a cached query plan or to generate a new one for parameterized queries arises from the unpredictability of parameter values at the time of query execution. This unpredictability complicates the decision-making process, as it requires an accurate prediction of how these parameter values will impact the performance of the query plan. The complexity of this problem is further amplified by the dynamic nature of databases. For example, changes in data distribution over time can affect the optimality of the cached plan, making it even more difficult to decide whether to stick with the cached plan or replace it with a new one. This highlights the intricate balance needed in managing parameterized queries in a constantly evolving database environment.

The technology described herein introduces a system and method for runtime parameterized query management, which can automatically determine, during runtime, whether to reuse or recompile a query plan. This feature ensures optimal performance by adapting to changes in parameter values and data distribution, thereby maintaining the efficiency and accuracy of database operations. This innovative approach offers a technical solution to the challenges posed by the dynamic nature of databases and the unpredictability of parameter values in query execution, thus representing a significant advancement in the field of database management systems.

Example Runtime Parameterized Query Management System

FIG. 1 shows an overall block diagram of an example runtime parameterized query management system 100, which is configured to automatically determine, in runtime, whether it should reuse an existing query plan or initiate a recompilation of the query plan.

In the example depicted in FIG. 1, the runtime parameterized query management system 100 includes a parameterized query plan manager 120 and a parameterized query log repository 160. Each received parameterized query 110 (with a corresponding input parameter set) to be run on a target database 150 can be processed by the parameterized query plan manager 120 and actions taken for the parameterized query 110, and related data can be stored in the parameterized query log repository 160. As described more fully below, the parameterized query plan manager 120 is configured to determine, in runtime, whether to reuse or recompile a cached query plan based on data stored in the parameterized query log repository 160.

In some examples, the received parameterized query 110 can have at least one corresponding query plan stored in a plan cache 130. The cached query plan can be previously compiled, e.g., by a query processing engine 140, for the parameterized query 110 based on the same input parameter set or a different parameter set. In some circumstances, the parameterized query plan manager 120 may determine to reuse one of the cached query plans to process the parameterized query 110. In this scenario, the query processing engine 140 can retrieve one of the cached query plans from the plan cache 130 and use it to execute the parameterized query 110 (with the input parameter set) against the target database 150.

In some examples, the received parameterized query 110 has no corresponding cached query plan, or even if the parameterized query 110 has corresponding cached query plans, the parameterized query plan manager 120 may determine that using one of the cached query plans would be undesirable (e.g., lead to a longer execution time than an estimated compilation-plus-execution time). In that scenario, the query processing engine 140 can compile and execute the parameterized query 110 (with the input parameter set) without using one of the cached query plans.

In some examples, the parameterized query plan manager 120 may initiate an update to the current set of cached query plans following multiple executions of the parameterized query 110. This update can be triggered when it is observed that frequent compilations, without using one of the cached query plans, are required for the parameterized query 110, thus indicating the previous set of cached query plans may be sub-optimal. This proactive approach can contribute to improved performance by updating a cached query plan to better align with the recurring needs of the parameterized query 110.

As shown in FIG. 1, the parameterized query log repository 160 includes compilation histories 170 and execution histories 180.

For each unique parameterized query 110 (which can have different input parameter sets), a corresponding compilation history 170 can be stored in the parameterized query log repository 160. The compilation history 170 can contain compilation-plus-execution times for compiling and executing the parameterized query with a plurality of unique parameter sets. As described herein, a parameter set is considered unique if no other parameter set has the exact same combination of parameter values in the same order. As described herein, the compilation-plus-execution time refers to the total time for first compiling a query to generate a query plan and then executing the query using the generated query plan. The size of the compilation history 170, which defines the maximum number of unique parameter sets and the corresponding compilation-plus-execution times that can be stored in the compilation history 170, can be predefined. In some examples, the parameterized query log repository 160 can store multiple compilation histories 170 which are respectively associated with multiple different parameterized queries.

Figure 2:
FIG. 2 depicts an example compilation history and an example execution history for a parameterized query.

As an example, FIG. 2 shows an example compilation history 210 associated with an example parameterized query 200, with the following query statement: SELECT*FROM Employees WHERE FirstName=? AND LastName=?. Here, the question mark is a placeholder which can be replaced with different parameter values at query runtime. The compilation history 210 includes compilation-plus-execution times (e.g., tc1, tc2, tc3, and tc4, collected denoted as $T_{com+exe}$) corresponding to four unique parameter sets 212, 214, 216, and 218, respectively. In this example, the size of the compilation history 210 is four, and each parameter set includes two parameter values (e.g., two strings) corresponding to two parameters ('FirstName' and 'LastName') defined in the parameterized query 200.

Returning to FIG. 1, each unique parameterized query 110 can have one or more previously compiled query plans that are stored in the plan cache 130. For each cached query plan, a corresponding execution history 180 can be stored in the parameterized query log repository 160. The execution history 180 can contain execution times for executing the parameterized query with a plurality of unique parameter sets by using the cached query plan (thus, no compilation of the parameterized query is involved). The plurality of unique parameter sets used to generate the execution history 180 can be different from (or be the same as) the plurality of unique parameter sets used to generate the compilation history 170. The size of the execution history 180, which defines the maximum number of unique parameter sets and the corresponding execution times that can be stored in the execution history 180, can be predefined. If a parameterized query 110 has multiple cached query plans, the parameterized query 110 can have multiple execution histories 180, each of which is associated with a corresponding cached query plan.

As an example, FIG. 2 shows an example execution history 220 associated with a query plan for the parameterized query 200. The execution history 220 includes execution times (e.g., te1, te2, and te3, collected denoted as $T_{exe}$) corresponding to three unique parameter sets 222, 224, and 226, respectively. In this example, the size of the execution history 220 is three, and each parameter set includes two parameter values (e.g., two strings) corresponding to two parameters ('FirstName' and 'LastName') defined in the parameterized query 200. In the depicted example, although the parameter set 222 is identical to the parameter set 212, none of other parameter sets in the execution history 220 is the same as any of the parameter sets in the compilation history 210.

As shown in FIG. 1, the parameterized query plan manager 120 includes a similarity analyzer 122, a cache gain calculator 124, a query plan updater 126, and a history manager 128. For the received parameterized query 110 with an input parameter set, the parameterized query plan manager 120 is configured to determine whether to reuse one of the cached plans or compile the parameterized query with the input parameter set from the beginning based on the compilation history 170 associated with the parameterized query 110 and the execution history 180 associated with the query plan. Maintenance and/or update of the compilation history 170 and the execution history 180 can be performed by the history manager 128.

Specifically, the parameterized query plan manager 120 can estimate the compilation-plus-execution time for compiling and executing the parameterized query 110 with the input parameter set based on the compilation history 170 associated with the parameterized query 110. Estimation of the compilation-plus-execution time can be performed by the similarity analyzer 122, which is configured to identify one unique parameter set among the plurality of unique parameter sets stored in the compilation history 170 that is most similar to the input parameter set. The underlying assumption is that the compilation-plus-execution time for a given parameter set will be similar to the compilation-plus-execution time for the most similar parameter set in the compilation history 170. This is based on the principle that similar parameter sets will likely result in similar query plans, and therefore, similar compilation and execution times.

The parameterized query plan manager 120 can also estimate the execution time for executing the parameterized query 110 with the input parameter set by using a query plan based on the execution history 180 associated with the query plan. Similarly, estimation of the execution time can also be performed by the similarity analyzer 122, which is configured to identify one unique parameter set among the plurality of unique parameter sets stored in the execution history 180 that is most similar to the input parameter set. The underlying assumption is that the execution time for a given parameter set will be similar to the execution time for the most similar parameter set in the execution history 180. This is based on the principle that similar parameter sets will likely result in similar query execution paths, and therefore, similar execution times.

The parameterized query plan manager 120 can then determine a cache gain based at least in part on the estimated compilation-plus-execution time and the estimated execution time. The cache gain indicates whether executing the parameterized query 110 by using a cached query plan can save time (thus preferred) compared to compiling the parameterized query 110 to generate a new query plan and then execute the new query plan (i.e., without using any cached query plan). A positive cache gain indicates that using a cached query plan would likely save time (thus more efficient) compared to compiling-and-executing a new query plan. Thus, the parameterized query plan manager 120 can make the decision to reuse the cached query plan to process the parameterized query 110 with the input parameter set. On the other hand, a non-positive (e.g., zero or negative) cache gain indicates that using a cached query plan is unlikely to save time compared to compiling-and-executing a new query plan. In that case, the parameterized query plan manager 120 can make the decision to compile and execute the parameterized query 110 with the input parameter set. As described hereinafter, the positive and non-positive cache gains are utilized as a standard (to determine whether to use a cached query plan or compile-and-execute a new query plan) for purpose of illustrations, although it should be understood that in some cases, the standard for the cache gain could be defined in a different way according to computing environments. For example, although the cache gain is non-positive, if the cache gain is within a predefined threshold, the system may consider using a cached query plan as saving processing time because of unexpected overheads from compilation. Calculation of the cache gain can be performed, e.g., by the cache gain calculator 124.

Figure 3:
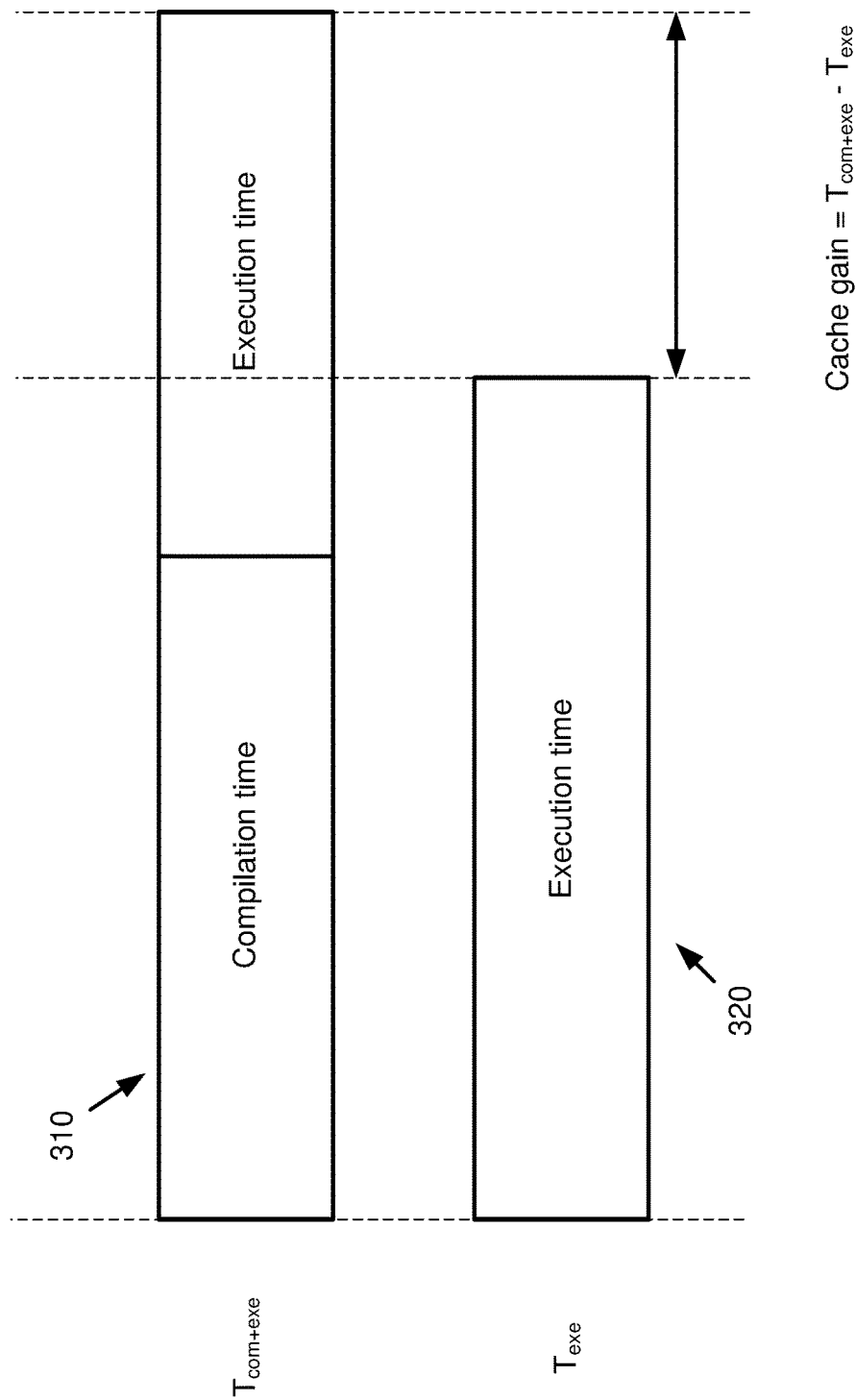
FIG. 3 is a schematic diagram illustrating determination of cache gain based on an estimated compilation-plus-execution time and an estimated execution time.

If the parameterized query 110 has only one cached query plan, the cache gain can be determined by calculating a difference between the estimated compilation-plus-execution time (obtained based on the compilation history 170 associated with the parameterized query 110) and the estimated execution time (obtained based on the execution history 180 associated with the query plan). An example is illustrated in FIG. 3, which shows an estimated compilation-plus-execution time 310 (denoted as $T_{com+exe}$) for a parameterized query, and an estimated execution time 320 (denoted as $T_{exe}$) for executing the parameterized query by using a cached query plan. As shown, the cache gain can be calculated as ($T_{com+exe} - T_{exe}$). In the depicted example, the cache gain is positive because $T_{com+exe}$ is larger than $T_{exe}$. In other examples, the cache gain can be zero or negative.

Returning to FIG. 1, if the parameterized query 110 has multiple cached query plans, multiple estimated execution times can be obtained based on multiple execution histories 180 associated with the multiple query plans, respectively. In that case, the smallest estimated execution time among the multiple estimated execution times can be determined, and the cache gain can be determined by calculating a difference between the estimated compilation-plus-execution time and the smallest estimated execution time.

The query plan updater 126 is configured to initiate updates to a cached query plan. Updating of the cached query plan can be triggered following multiple executions of the parameterized query 110. The need for an update can be identified when it is observed that incoming parameterized queries 110 frequently result in non-positive cache gains, thus necessitating compilation and execution of the parameterized query 110. This indicates that the current set of cached query plans is sub-optimal or outdated, and reusing it is unlikely to save time compared to compiling-and-executing a new query plan. By updating the current set of cached query plans, the query plan updater 126 aims to create a more efficient set of query plans that can be reused more frequently for future incoming parameterized queries 110, thereby potentially improving efficiency and reducing resource usage over time.

In practice, the systems shown herein, such as the runtime parameterized query management system 100, can vary in complexity, with additional functionality, more complex components, and the like. For example, there can be additional functionality within the parameterized query plan manager 120. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The runtime parameterized query management system 100 and any of the other systems described herein can be implemented in conjunction with any of the hardware components described herein, such as the computing systems described below (e.g., processing units, memory, and the like). In any of the examples herein, the query plans, the compilation history, the execution history, and the like can be stored in one or more computer-readable storage media or computer-readable storage devices. The technologies described herein can be generic to the specifics of operating systems or hardware and can be applied in any variety of environments to take advantage of the described features.

Figure 4:
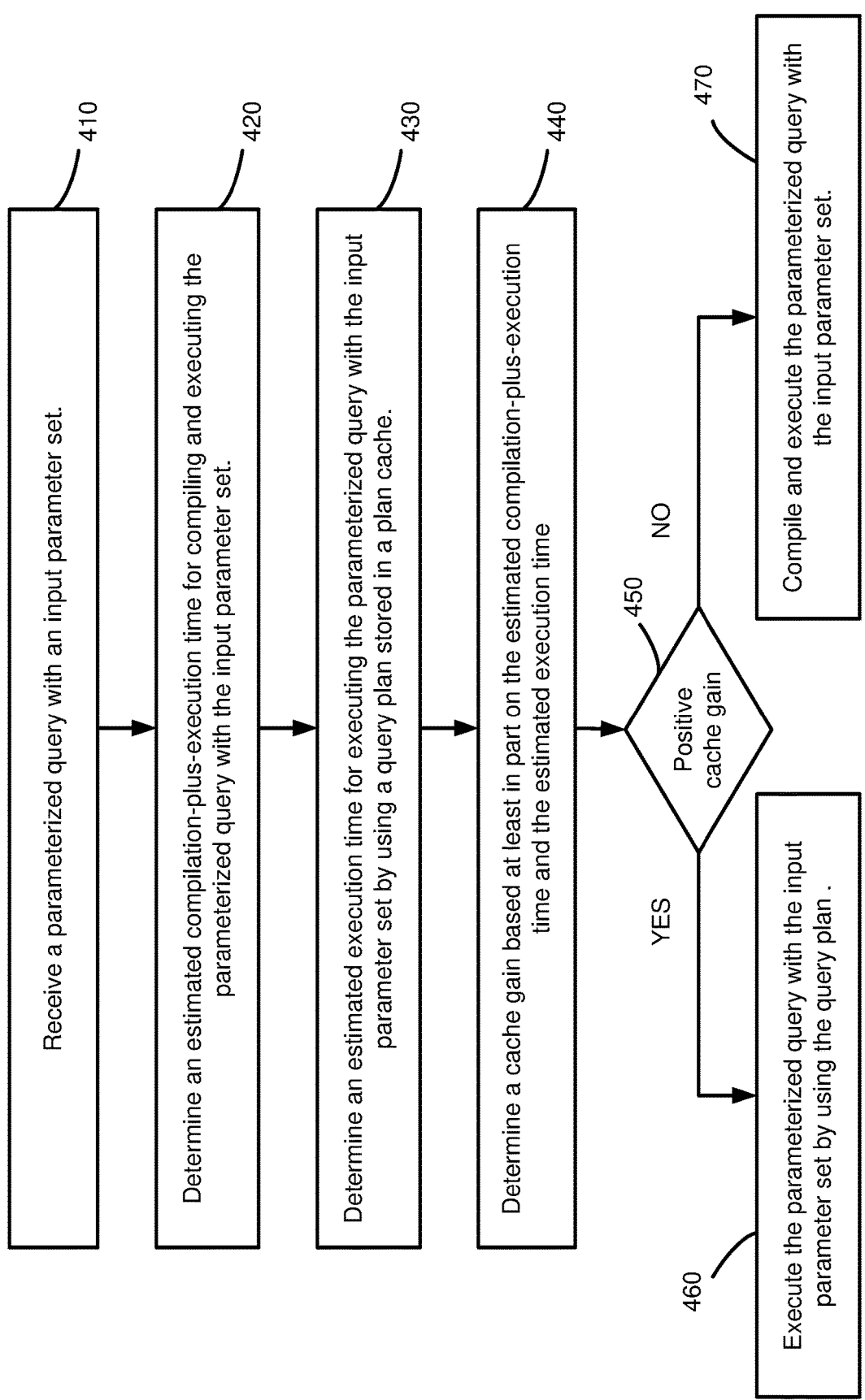
FIG. 4 is a flowchart illustrating an example overall method of implementing runtime parameterized query recompilation.

Example Overall Method for Implementing
Runtime Parameterized Query Recompilation FIG. 4 is a flowchart illustrating an example overall method 400 of implementing runtime parameterized query recompilation, and can be performed, for example, by the runtime parameterized query management system 100 of FIG. 1.

At step 410, a parameterized query with an input parameter set is received (e.g., by the parameterized query plan manager 120). As described above, parameterized query can be associated with a compilation history (e.g., the compilation history 170), which includes compilation-plus-execution times for compiling and executing the parameterized query with a plurality of unique parameter sets. The parameterized query has at least one query plan stored in a plan cache. The query plan can be associated with an execution history (e.g., the execution history 180), which includes execution times for executing the parameterized query with a plurality of unique parameter sets by using the query plan. The plurality of unique parameter sets included in the execution history can be different from the plurality of unique parameter sets included in the compilation history.

At step 420, an estimated compilation-plus-execution time for compiling and executing the parameterized query with the input parameter set can be determined based on the compilation history associated with the parameterized query. Determining the estimated compilation-plus-execution time for compiling and executing the parameterized query with the input parameter set can include determining one unique parameter set among the plurality of unique parameter sets stored in the compilation history that is most similar to the input parameter set.

At step 430, an estimated execution time for executing the parameterized query with the input parameter set by using the query plan can be estimated based on the execution history associated with the query plan. Determining the estimated execution time for executing the parameterized query with the input parameter set by using the query plan can include determining one unique parameter set among the plurality of unique parameter sets stored in the execution history that is most similar to the input parameter set.

At step 440, a cache gain can be determined based at least in part on the estimated compilation-plus-execution time (obtained in step 420) and the estimated execution time (obtained in step 430). For example, when the parameterized query has a single cached query plan, the cache gain can be determined by calculating subtracting the estimated execution time from the estimated compilation-plus-execution time. However, if the parameterized query has multiple cached query plans, each query plan has its own associated execution history. Thus, multiple estimated execution times can be obtained (e.g., in step 430), each based on the execution history associated with a specific query plan. In such a scenario, the smallest estimated execution time is selected from the multiple estimates. The cache gain can then be calculated by subtracting this smallest estimated execution time from the estimated compilation-plus-execution time.

At step 450, a condition check is performed to determine if the cache gain obtained at step 440 is positive or not.

If the cache gain is found to be positive, the method 400 proceeds to step 460 to execute the parameterized query with the input parameter set by using the query plan (assuming the parameterized query has a signal cached query plan). If the parameterized query has multiple cached query plans, a query plan associated with the smallest estimated execution time is selected for usage when executing the parameterized query.

On the other hand, if the cache gain found to be non-positive (e.g., zero or negative), the method 400 proceeds to step 470 to compile and execute the parameterized query with the input parameter set.

The method 400 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example Methods for Measuring Similarity
Between Parameter Sets

As described above, the process of estimating the compilation-plus-execution time for a parameterized query involves identifying a unique parameter set from a compilation history that is most similar to the input parameter set. Similarly, the estimated execution time for the query is determined by identifying a unique parameter set from the execution history that mostly matches the input parameter set. The methods for measuring similarity between parameter sets can involve various techniques.

In some examples, distance-based measures can be used to determine one unique parameter set among a plurality of unique parameter sets that is most similar to the input parameter set. Specifically, distances between the input parameter set and a plurality of unique parameter sets (in the compilation history or the execution history) can be measured. A unique parameter set that has the smallest distance among the measured distances can be identified as the one that is most similar to the input parameter set.

Different distance measures can be used depending on data types of the parameter values contained in the parameter sets. For example, Euclidean and Manhattan distances can be used for continuous numerical data, Hamming distance can be used for categorical data, Levenshtein distance can be used for string data, etc. For parameter sets with mixed data types, Gower's distance can be used.

In some examples, different weights can be assigned to different parameters in a parameter set based on their importance when calculating the distance. In some examples, normalization, such as scaling to the [0,1] range or Z-score normalization, can be used to ensure all parameters contribute equally to the distance calculation, regardless of their scale.

In some examples, the process of determining the unique parameter set that is most similar to the input parameter set involves calculating a selectivity value (or simply "selectivity") for the input parameter set and selectivity values for the plurality of unique parameter sets (in the compilation history or the execution history). Selectivity is a measure of how selective a predicate is, e.g., the selectivity can indicate how many rows the predicate matches out of the total number of rows in a table. In some examples, the selectivity of a parameterized query can be determined based on statistics and/or histograms that are stored in the database, which contain information about the distribution of values in a column or a set of columns. The selectivity can be used as a measure to quantify the degree of similarity between the input parameter set and the unique parameter sets in the compilation or execution history. Specifically, the unique parameter set with the selectivity value that is closest to the selectivity value of the input parameter set can be identified as the most similar one.

In addition to, or in lieu of, the methods described above, other similarity measures (e.g., cosine similarity, Jaccard index, Pearson or Spearman correlation coefficients, etc.) can also be employed to measure similarity between parameter sets, and the choice of similarity measure can be tailored to the specific characteristics of the parameter sets. Further, machine learning algorithms for pattern recognition, or even custom heuristic methods tailored to the specific characteristics of the parameter sets, can be used to measuring similarity between different parameter sets.

Example Method for Updating Compilation History for a Parameterized Query

Figure 5:
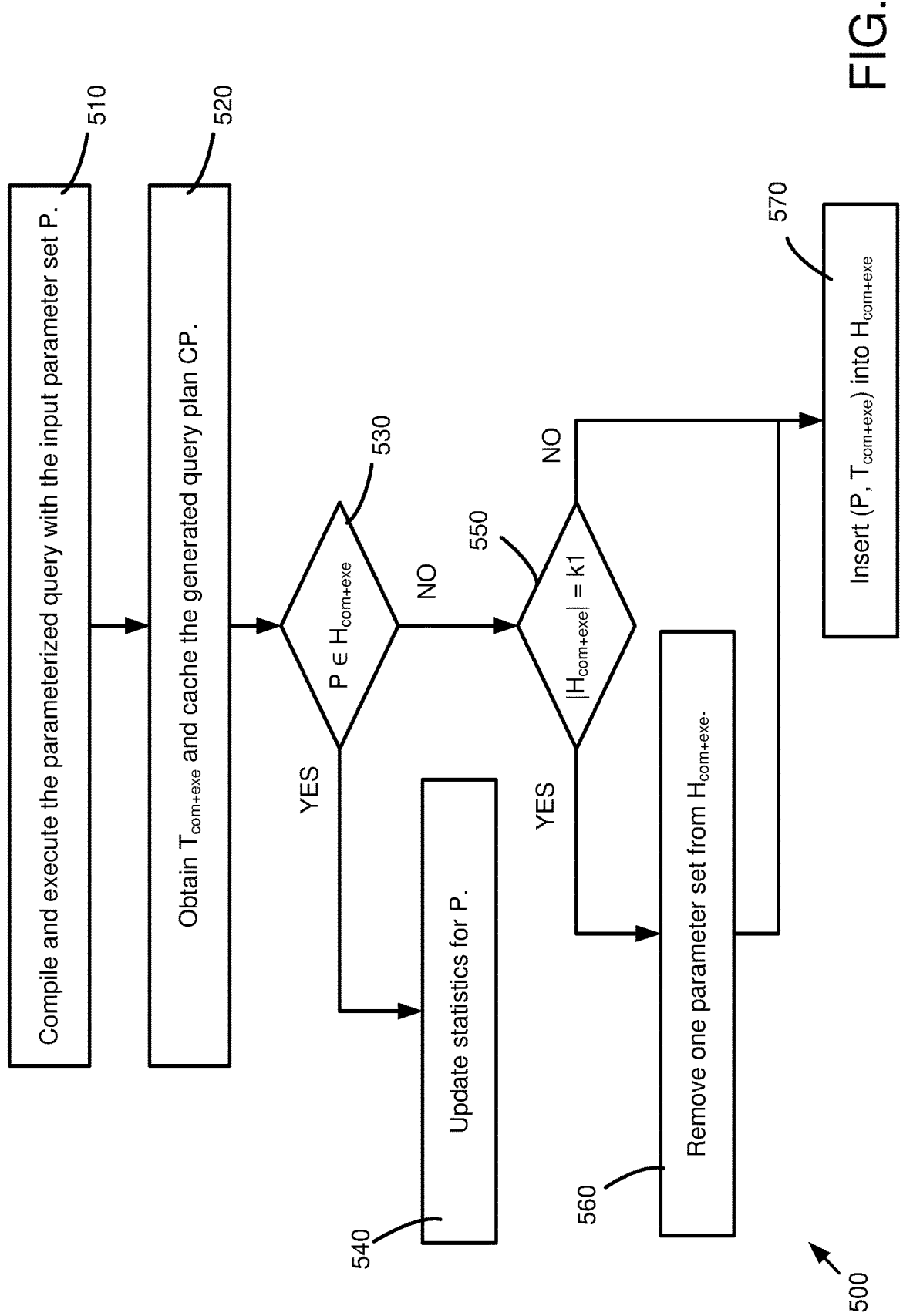
FIG. 5 is a flowchart illustrating an example method for updating a compilation history for a parameterized query.

As described herein, the compilation history associated with a parameterized query can be dynamically updated when processing the parameterized query. FIG. 5 is a flow chart describing an example method 500 of updating the compilation history for a parameterized query, and can be implemented, e.g., by the history manager 128 of FIG. 1.

In general, the method 500 can be performed during an initialization phase when the compilation history has not been completely filled (e.g., the number of unique parameter sets and the corresponding compilation-plus-execution times stored in the compilation history is less than the maximum size of the compilation history). Additionally, the method 500 can be performed during runtime when processing of the parameterized query triggers an update of the compilation history, as described further below with reference to FIG. 8.

At step 510, the parameterized query with an input parameter set P is compiled to generate a cached plan (CP) and then executed.

At step 520, the compilation-plus-execution time (denoted as $T_{com+exe}$) of step 510 is obtained, and the generated cached plan CP can be stored in a plan cache.

At step 530, a condition check can be performed to determine if the input parameter set P is stored in a compilation history (denoted as $H_{com+exe}$) associated with the parameterized query.

If the input parameter set P already exists in the compilation history, then the method 500 proceeds to step 540 to update statistics for P. Specifically, the compilation-plus-execution time corresponding to the input parameter set P that are stored in the compilation history will be updated based on the newly obtained compilation-plus-execution time $T_{com+exe}$. Such update can be implemented in different ways. For example, the stored compilation-plus-execution time corresponding to the input parameter set P can be replaced with the newly obtained compilation-plus-execution time $T_{com+exe}$. As another example, the stored compilation-plus-execution time corresponding to the input parameter set P can be updated using a weighted average of the stored and newly obtained values. This can be expressed as: $T_{new} = \alpha \cdot T_{com+exe} + (1-\alpha) \cdot T_{stored}$, where $T_{new}$ is the updated compilation-plus-execution time, $T_{com+exe}$ is the newly obtained compilation-plus-execution time, $T_{stored}$ is the stored compilation-plus-execution time, and a is a predefined weighting factor ($0 \leq \alpha \leq 1$).

On the other hand, if the input parameter set P is not present in the compilation history (i.e., P represents another unique parameter set), the method 500 advances to step 550. At this stage, it verifies if the compilation history has reached its capacity. Specifically, it checks whether the count of unique parameter sets, along with their respective compilation-plus-execution times stored in the compilation history, has hit a predefined limit (denoted as k1) which represents the maximum size of the compilation history.

If the compilation history has not reached its capacity, the method 500 proceeds to step 570 to insert the input parameter set P into the compilation history, paired with the obtained compilation-plus-execution time $T_{com+exe}$. On the other hand, if the compilation history has already reached its capacity, the method 500 first advances to step 560 to remove one unique parameter set from the compilation history, and then proceeds to step 570 for the insertion. In other words, the input parameter set P (with the pairing $T_{com+exe}$) replaces one of the previously stored parameter sets (and the corresponding compilation-plus-execution time). The selection of which stored parameter set to remove can be based on a predefined eviction policy (e.g., random eviction policy, Least Recently Used (LRU) eviction policy, Least Frequently Used (LFU) eviction policy, First-In-First-Out (FIFO) eviction policy, etc.).

Figure 6:
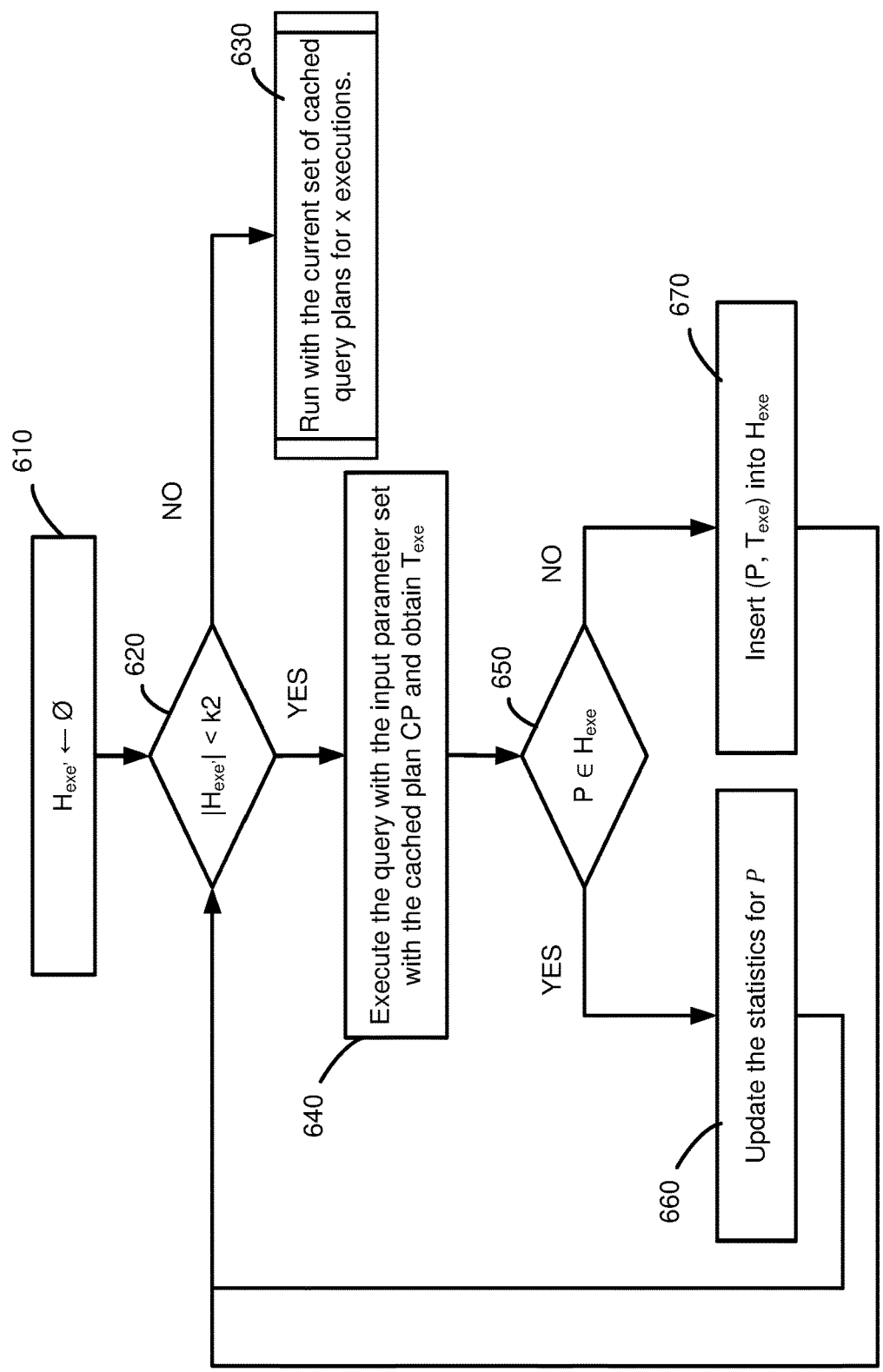
FIG. 6 is a flowchart illustrating an example method for updating an execution history associated with a query plan for a parameterized query.

Example Method for Updating Execution History of a Query Plan for a Parameterized Query After updating the compilation history using the method 500 of FIG. 5, the execution history associated with the newly cached query plan CP can be updated. FIG. 6 is a flow chart describing an example method 600 of updating the execution history associated with a query plan, and can be implemented, e.g., by the history manager 128 of FIG. 1.

At step 610, the execution history (denoted as $H_{exe}$) associated with a cached query plan is first cleared or initialized to be empty.

At step 620, a condition check is performed to determine if the execution history has reached its capacity. Specifically, it checks whether the count of unique parameter sets, along with their respective execution times (by using the cached query plan) stored in the execution history, has hit a predefined limit (denoted as k2) which represents the maximum size of the execution history.

If the execution history already reaches its capacity, the method 600 proceeds to step 630 to run with the current set of cached query plans for a number of executions, as explained further below with reference to FIG. 7. The number of executions to be run (denoted as x) can be a predefined parameter. For example, x can be 2, 3, 4, or more. In one special circumstance, x can be set to 1.

On the other hand, if the execution history has not reached its capacity, the method 600 proceeds to step 640 to execute the parameterized query with the input parameter set P by using the cached query plan. The corresponding execution time (denoted as $T_{exe}$) can be obtained.

Then at step 650, another condition check is performed to determine if the input parameter set P is stored in the execution history ($H_{exe}$) associated with the cached query plan.

If the input parameter set P already exists in the execution history, then the method 600 proceeds to step 660 to update statistics for P. Specifically, the execution time corresponding to the input parameter set P that are stored in the execution history can be updated based on the newly obtained execution time $T_{exe}$. Such update can be implemented in different ways. For example, the stored execution time corresponding to the input parameter set P can be replaced by the newly obtained execution time $T_{exe}$. As another example, the stored execution time corresponding to the input parameter set P can be updated using a weighted average of the stored and newly obtained values. This can be expressed as: $T_{new} = \beta \cdot T_{exe} + (1-\beta) \cdot T_{stored}$, where $T_{new}$ is the updated execution time, $T_{exe}$ is the newly obtained execution time, $T_{stored}$ is the stored execution time, and $\beta$ is a predefined weighting factor ($0 \leq \beta \leq 1$).

On the other hand, if the input parameter set P is not present in the execution history (i.e., P represents another unique parameter set), the method 600 advances to step 670 to insert the input parameter set P into the execution history, paired with the obtained execution time $T_{exe}$.

After step 660 or step 670, the method 600 can return to step 620 to check if the execution history has reached its capacity. In other words, the method 600 can continue to update the execution history until it reaches its capacity.

Example Method for Determining Whether a Cached Query Plan Needs Replacement

After the execution history associated with the cached query plan has been updated and reached its capacity, the current set of cached query plans can be used to execute incoming parameterized queries (with any valid input parameter sets) for a number of executions. For each execution, an evaluation is made to determine if using one of the cached query plans is beneficial (e.g., save time) or not compared to an alternative approach of compiling-and-executing a new query plan using the input parameter set. Based on such evaluations, a decision can be made whether the current set of cached query plans needs to be replaced.

Figure 7:
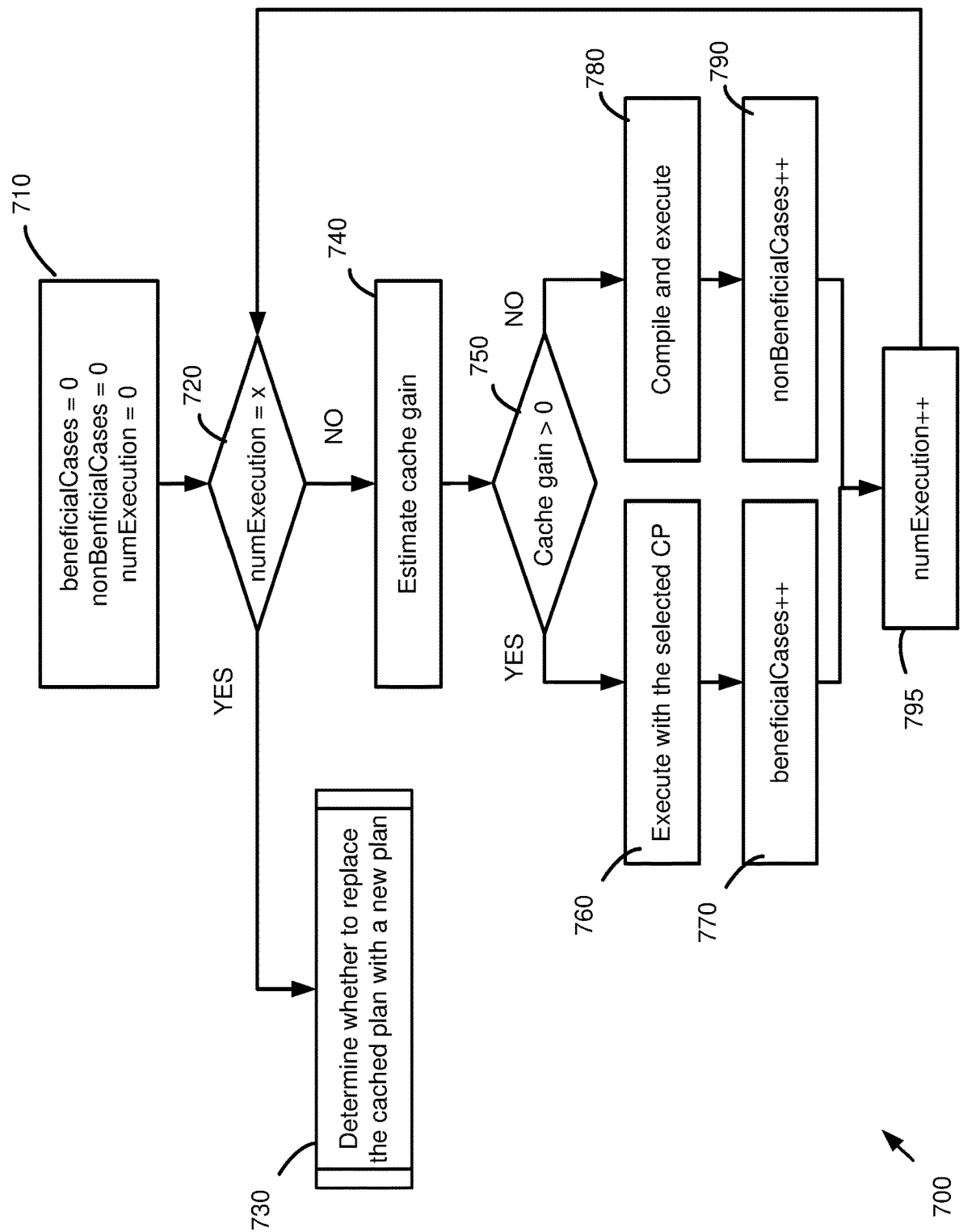
FIG. 7 is a flowchart illustrating an example method for counting beneficial cases and non-beneficial cases when running with a set of cached query plans for a number of executions.
Figure 8:
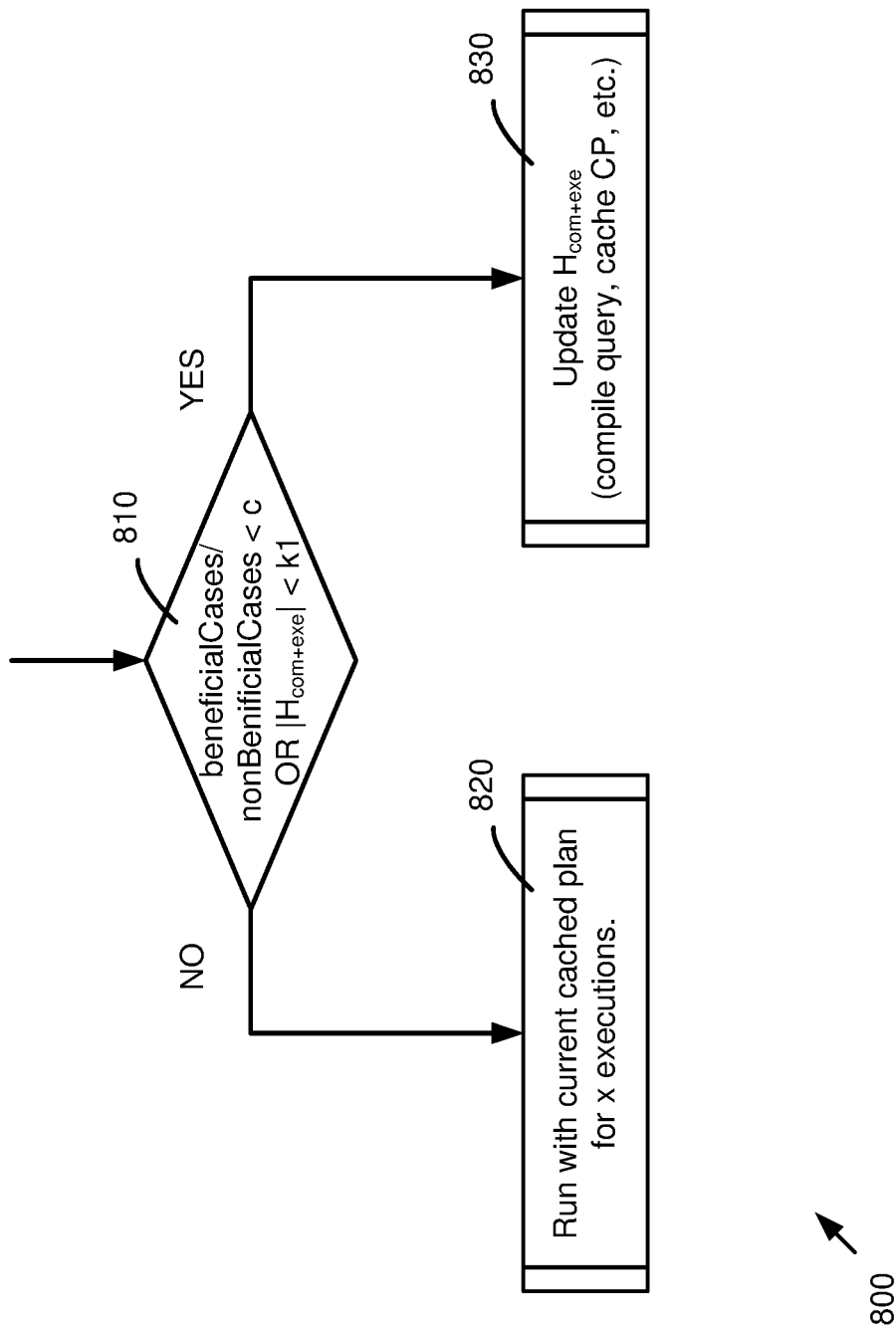
FIG. 8 is a flowchart illustrating an example method for determining whether a cached query plan needs to be replaced.

FIG. 7 is a flow chart describing an example method 700 of running and evaluating a number of executions of the parameterized query (with any valid input parameter sets) using the current set of cached query plans. FIG. 8 is a flow chart describing an example method 800 of determining whether a cached query plan needs to be updated. The methods 700 and 800 can be implemented, e.g., by the query plan updater 126 of FIG. 1.

Referring to FIG. 7, the method 700 starts at step 710 by initializing three counters: the count of beneficial cases (denoted as beneficialCases) and the count of non-beneficial cases (denoted as nonBeneficialCases) can be set to 0, and the count of executions (denoted as numExecution) of the parameterized query using the current set of cached query plans can also be set to 0.

At step 720, a condition check is performed to determine if the count of executions has reached a predefined limit x, wherein x is a positive integer (e.g., x can be 1, 2, 3, 4, or more). If so, the method 700 can go to step 730 to determine whether to replace one of the cached query plans with a new query plan, which can be implemented by the method 800 of FIG. 8 described further below.

Otherwise (i.e., numExecution<x), the method 700 moves to step 740 to estimate or calculate a cache gain. As described above, the cache gain can be calculated by: (a) estimating the compilation-plus-execution time for compiling and executing the parameterized query with the input parameter set based on the compilation history associated with the parameterized query; (b) estimating the execution time for executing the parameterized query with the input parameter set by using the query plan based on the execution history associated with the query plan; and (c) calculating a difference between the estimated compilation-plus-execution time and the estimated execution time. Further, as described above, if the cached query plan is the only plan for the parameterized query, the cache gain is calculated by subtracting the estimated execution time from the estimated compilation-plus-execution time. However, if the parameterized query has multiple cached query plans, each query plan has its own associated execution history. This results in multiple estimated execution times, each based on the execution history associated with a specific query plan. In such a case, the smallest estimated execution time is selected from the multiple estimates. The cache gain is then calculated by subtracting this smallest estimated execution time from the estimated compilation-plus-execution time.

Then, a condition check whether the cache gain is positive or not can be performed at step 750.

If the cache gain is positive, reusing the cached query plan is deemed to be beneficial (e.g., saving time) compared to compiling-and-executing a new query plan. Thus, the method 700 can proceed to step 760 to execute the parameterized query using the cached query plan (or the cache plan associated with the smallest estimated execution time if the parameterized query has multiple cached query plans). Then, at step 770, the counter for beneficial cases is incremented.

On the other hand, if the cache gain is negative (or zero), reusing the cached query plan is deemed to be non-beneficial (e.g., not saving time) compared to compiling-and-executing a new query plan. Thus, the method 700 can branch to step 780 to compile and execute the parameterized query. Then, at step 790, the counter for non-beneficial cases is incremented.

After step 770 or step 790, the method 700 can proceed to step 795 to increase the count of executions by one, before returning to step 720 to check if the count of executions has reached the predefined limit x. In other words, the method 700 can continue to execute and evaluate the parameterized query using the current set of cached query plans until the number of executions has reached the predefined limit x, when a decision can be made whether or not the current set of cached query plans needs to be updated, as described in the example method 800 of FIG. 8.

At step 810, a condition check is performed to determine if (a) the ratio of beneficialCases to nonBeneficialCases is smaller than a predefined threshold, or (b) the count of unique parameter sets in the compilation history is less than the maximum size of the compilation history. If yes, the method 800 proceeds to step 830 to update the compilation history (including compilation of the parameterized query and caching the generated query plan), e.g., by using the method 500 of FIG. 5. If no, the method 800 proceeds to step 820 to run with the current cached query plans for a number of executions, e.g., by using the method 700 of FIG. 7. In other words, the method 800 will compile and execute the parameterized query, cache the generated query plan (and replace a previously cached query plan, if any), and update the compilation history when the compilation history is not full, when reusing the current set of cached query plans has too frequently led to non-beneficial cases (e.g., not saving time). Otherwise, the method 800 will continue to execute and evaluate the parameterized query using the current set of cached query plans if the condition check at step 810 returns false.

The predefined threshold c controls how often the occurrence of non-beneficial case is deemed too frequent. In one special case, the threshold c can be 1. In that case, the calculation of the ratio above is equivalent to compare beneficialCases with nonBeneficialCases. In another special case where x is set to 1, instead of calculating the ratio beneficialCases/nonBeneficialCases, the occurrence of a single non-beneficial case can trigger replacement of a cached query plan and update of the compilation history.

Figure 9:
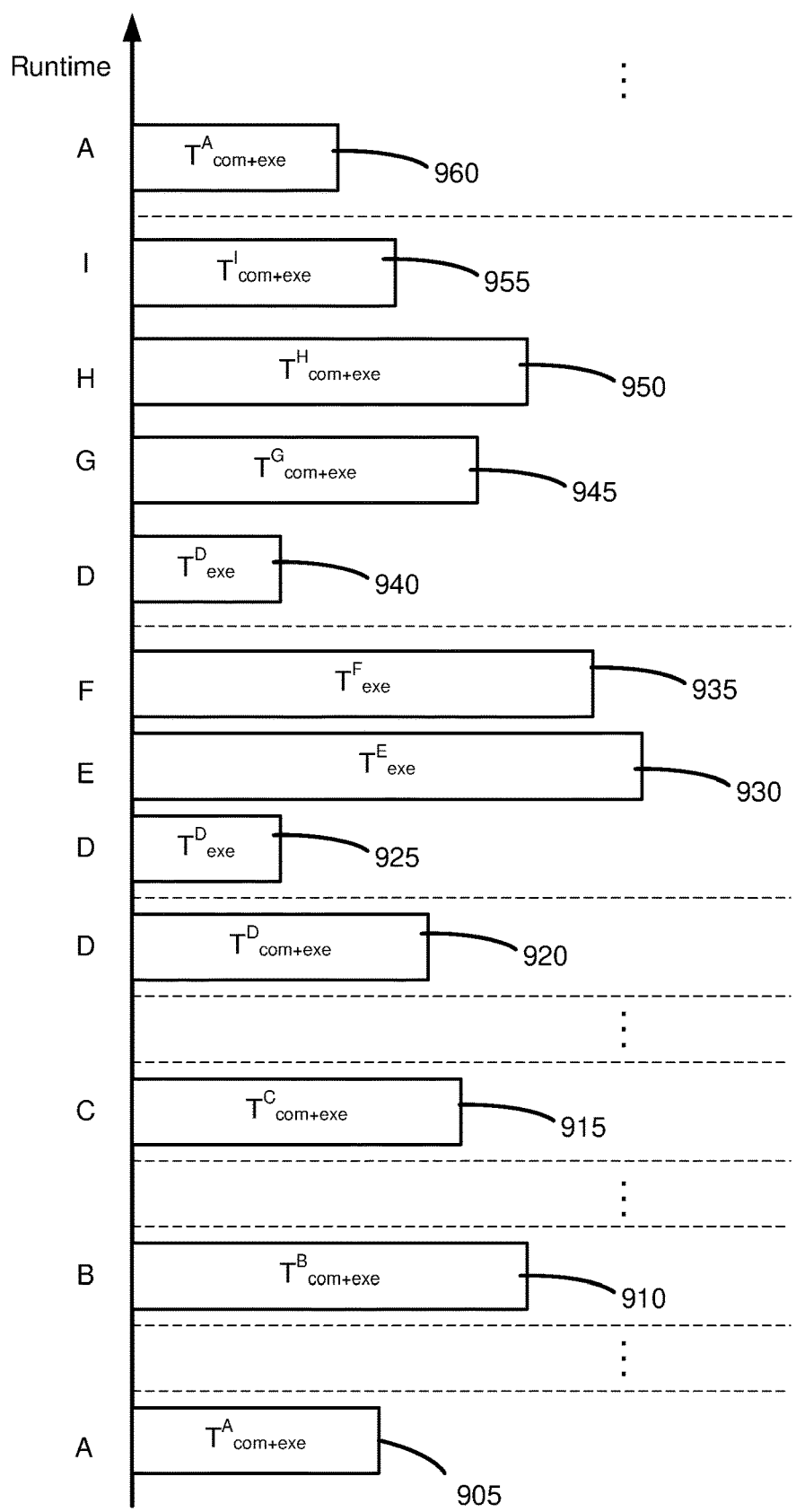
FIG. 9 is a schematic diagram illustrating a use case of runtime parameterized query recompilation where a parameterized query has a single query plan.

Example Use Case of Runtime Parameterized Query Recompilation where a Parameterized Query has a Single Query Plan FIG. 9 schematically depicts a use case to further illustrate the runtime parameterized query recompilation technologies described herein. In this use case, a parameterized query is assumed to have a single cached query plan (thus the parameterized query has only one execution history associated with the query plan).

FIG. 9 depicts processing of a parameterized query with varying input parameter sets (e.g., parameter sets A, B, C, etc.) in runtime. In this example, both the maximum size of the compilation history (k1) and the maximum size of the execution history (k2) are set to 3, the predefined limit (x) for executing and evaluating the parameterized query using the cached query plan is set to 4, and the threshold c is set to 1. In this example, $T_{com+exe}^{A}$ denotes the compilation-plus-execution time for compiling and executing the parameterized query with the parameter set A, and $T_{exe}^{A}$ denotes the execution time for executing the parameterized query with the parameter set A using the cached query plan. The ellipses denote processing of some additional queries.

Initially, the compilation history associated with the parameterized query stores three compilation-plus-execution times 905, 910, 915 for compiling and executing the parameterized query with three different parameter sets A, B, and C, respectively. Then, the parameterized query is compiled and executed again when processing the parameterized query with an input parameter set D (e.g., the condition check at step 810 of FIG. 8 returns false). The generated query plan is then saved in the plan cache (and replaces the previously cached query plan), and the corresponding compilation-plus-execution time 920 is stored in the compilation history. Because the compilation history is already full, a previously stored parameter set A and its compilation-plus-execution time 905 will be removed from the compilation history (e.g., step 560 of FIG. 5), e.g., according to a predefined eviction policy. The compilation history will thus be updated to include three compilation-plus-execution times 910, 915, and 920 corresponding to parameter sets B, C, and D, respectively.

Then, the execution history associated with the cached query plan will be created, e.g., using the method 600 of FIG. 6. In the depicted example, using the cached query plan (obtained with the input parameter set D), execution times 925, 930, and 935 for executing the parameterized query with three different parameter sets D, E, and F are obtained and stored in the execution history.

Next, the parameterized query with the input parameter set D is processed, and the cache gain can be estimated (e.g., step 740 of FIG. 7). In this example, the input parameter set D is found to be most similar to the parameter set D stored in the compilation history (e.g., among parameter sets B, C, and D), thus the estimated compilation-plus-execution time for compiling and executing the parameterized query with the input parameter set D is estimated to be 920 ($T_{com+exe}^{D}$). The input parameter set D is also found to be most similar to the parameter D stored in the execution history (e.g., among parameter sets D, E, and F), thus the estimated execution time for executing the parameterized query with the input parameter set D using the cached query plan is 925 ($T_{exe}^{D}$). Because $T_{com+exe}^{D}$ is larger than $T_{exe}^{D}$ in this example, the estimated cache gain is positive. Thus, the cached query plan will be used to execute the parameterized query with the input parameter set D, resulting in an execution time 940, and the count of beneficial case will be incremented (steps 760, 770 of FIG. 7).

Next, the parameterized query with the input parameter set G is processed, and the cache gain can be estimated (e.g., step 740 of FIG. 7). In this example, the input parameter set G is found to be most similar to the parameter set B stored in the compilation history (e.g., among parameter sets B, C, and D), thus the estimated compilation-plus-execution time for compiling and executing the parameterized query with the input parameter set G is 910 ($T_{com+exe}^{B}$). Additionally, the input parameter set G is found to be most similar to the parameter E stored in the execution history (e.g., among parameter sets D, E, and F), thus the estimated execution time for executing the parameterized query with the input parameter set G using the cached query plan is 930 ($T_{exe}^{E}$). Because $T_{com+exe}^{B}$ is smaller than $T_{exe}^{E}$ in this example, the estimated cache gain is negative. Thus, instead of using the cached query plan, the parameterized query with the input parameter set G will be compiled and executed, resulting in a compilation-plus-execution time 945, and the count of non-beneficial case will be incremented (e.g., steps 780, 790 of FIG. 7). Note that the cached query plan (obtained with the input parameter set D) remains unchanged.

Then, the parameterized query with the input parameter sets H and I are processed. In both cases, it is assumed that the estimated cache gain is negative (like the parameterized query with the input parameter set G). As a result, the parameterized query with the input parameter sets H and I are compiled and executed, resulting in compilation-plus-execution times 950 and 955, after which the count of non-beneficial case becomes three.

Now, the total number of executions of the parameterized query is four, including one beneficial case and three non-beneficial cases. Thus, the cached query plan (obtained with the input parameter set D) needs to be replaced, and the compilation history needs to be updated (e.g., steps 810 and 830 of FIG. 8). In the depicted example, the parameterized query with the input parameter set A is received next. Thus, after compiling and executing the parameterized query, the newly generated query plan (obtained with the input parameter set A) will replace the previously cached query plan (e.g., obtained with the input parameter set D). The compilation history will also be updated accordingly. In this example, the compilation-plus-execution time 960 for compiling and executing the parameterized query with the input parameter set A can be stored in the compilation history, and an existing entry in the compilation history (e.g., the compilation-plus-execution time 920 corresponding to the parameter set D) can be removed according to the predefined eviction policy.

The similar process can continue for the parameterized query with other input parameter sets to determine whether to reuse the cached query plan or compiling-and-executing the parameterized query with a new query plan, and whether the cached query plan needs to be replaced.

Figure 10:
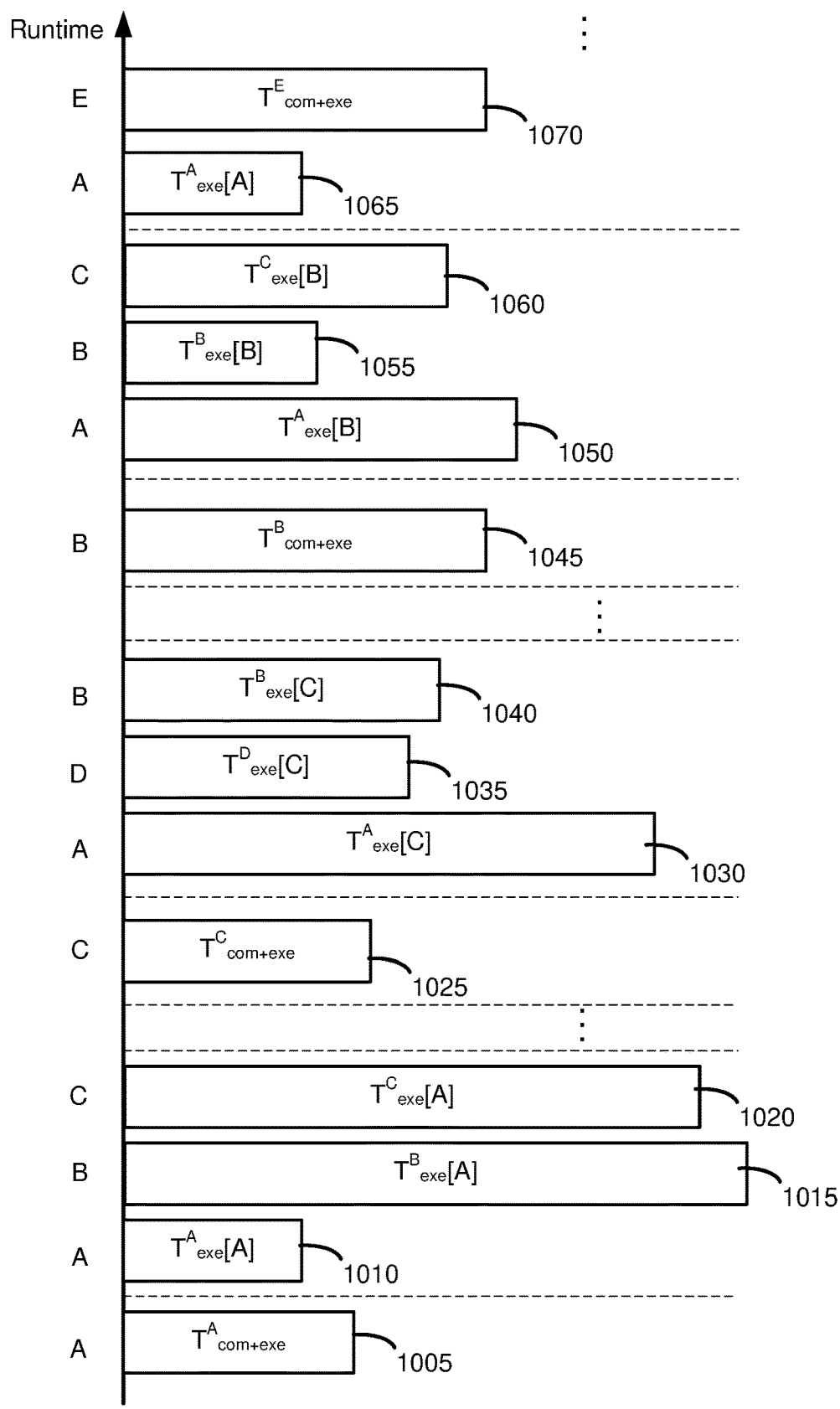
FIG. 10 is a schematic diagram illustrating another use case of runtime parameterized query recompilation where a parameterized query has multiple query plans.

Example Use Case of Runtime Parameterized Query Recompilation where a Parameterized Query has Multiple Query Plans FIG. 10 schematically depicts another use case to further illustrate the runtime parameterized query recompilation technologies described herein. In this use case, a parameterized query is assumed to have three different cached query plans, and each cached query plan has one associated execution history.

Similarly, FIG. 10 depicts processing of a parameterized query with varying input parameter sets (e.g., parameter sets A, B, C, etc.) in runtime. In this example, both the maximum size of the compilation history (k1) and the maximum size of the execution history (k2) are set to 3, the predefined limit (x) for executing and evaluating the parameterized query using the current set of cached query plans is set to 4, and the threshold c is set to 1. In this example, $T_{com+exe}^{A}$ denotes the compilation-plus-execution time for compiling and executing the parameterized query with the parameter set A, and $T_{exe}^{A}[P]$ denotes the execution time for executing the parameterized query with the parameter set A using a cached query plan P. The ellipses denote processing of some additional queries.

Initially, the compilation history includes compilation-plus-execution times 1005 and 1025 for compiling and executing the parameterized query with input parameter sets A and C, respectively. Using a cached query plan obtained with the parameter set A, a corresponding execution history stores execution times 1010, 1015, and 1020 for executing the parameterized query with three different input parameter sets A, B, and C, respectively. Using another cached query plan obtained with the parameter set C, a corresponding execution history stores execution times 1030, 1035, and 1040 for executing the parameterized query with three different input parameter sets A, D, and B, respectively.

Then, the parameterized query with an input parameter set B is received. Because the compilation history has not reached its full capacity, the parameterized query is compiled and executed, resulting in another cached query plan (obtained with the parameter set B), and the compilation history is updated by adding the compilation-plus-execution time 1045 corresponding to the parameter set B (e.g., steps 810 and 830 of FIG. 8).

Next, an execution history associated with the newly cached query plan (obtained with the parameter set B) is created, e.g., using the method 600 of FIG. 6. In the depicted example, using the cached query plan (obtained with the input parameter set B), execution times 1050, 1055, and 1060 for executing the parameterized query with three different parameter sets A, B, and C are obtained and stored in the execution history associated with the newly cached query plan (obtained with the parameter set B).

Next, the parameterized query with an input parameter set A is received, and the cache gain can be estimated (e.g., step 740 of FIG. 7). In this example, the input parameter set A is found to be most similar to the parameter set A stored in the compilation history (e.g., among parameter sets A, C, and B), thus the estimated compilation-plus-execution time for compiling and executing the parameterized query with the input parameter set A is 1005 ($T_{com+exe}^{A}$). Then for each of the three execution histories, an estimated execution time by using the corresponding cached query plan can be determined. For example, the input parameter set A is found to be most similar to the parameter set A stored in the execution history (e.g., among parameter sets A, B, and C) associated with the cached query plan obtained with the parameter set A. Thus, the first estimated execution time for executing the parameterized query with the input parameter set A (using the cached query plan obtained with the parameter set A) is 1010 ($T_{exe}^{A}[A]$). The input parameter set A is also found to be most similar to the parameter set A stored in the execution history (e.g., among parameter sets A, D, and B) associated with the cached query plan obtained with the parameter set C. Thus, the second estimated execution time for executing the parameterized query with the input parameter set A (using the cached query plan obtained with the parameter set C) is 1030 ($T_{exe}^{A}[C]$). Likewise, the input parameter set A is found to be most similar to the parameter set A stored in the execution history (e.g., among parameter sets A, B, and C) associated with the cached query plan obtained with the parameter set B. Thus, the third estimated execution time for executing the parameterized query with the input parameter set A (using the cached query plan obtained with the parameter set B) is 1050 ($T_{exe}^{A}[B]$).

Among the three estimated execution times 1010 ($T_{exe}^{A}[A]$), 1030 ($T_{exe}^{A}[C]$) and 1050 ($T_{exe}^{A}[B]$), the first one 1010 ($T_{exe}^{A}[A]$) is the smallest. As described above, the estimated cache gain can then be calculated as $T_{com+exe} - T_{exe}^{A}[A]$, which is positive in the depicted example. Thus, the parameterized query with input parameter A will be executed using the cached query plan obtained with the parameter set A, with an execution time 1065. The counter for beneficial cases will also be incremented.

Next, the parameterized query with an input parameter set E is received, and the cache gain can be similarly estimated. In this example, the input parameter set E is found to be most similar to the parameter set C stored in the compilation history (e.g., among parameter sets A, C, and B), thus the estimated compilation-plus-execution time for compiling and executing the parameterized query with the input parameter set E is 1025 ($T_{com+exe}^{C}$). Then for each of the three execution histories, an estimated execution time by using the corresponding cached query plan can be estimated. For example, the input parameter set E is found to be most similar to the parameter set C stored in the execution history (e.g., among parameter sets A, B, and C) associated with the cached query plan obtained with the parameter set A. Thus, the first estimated execution time for executing the parameterized query with the input parameter set E (using the cached query plan obtained with the parameter set A) is 1020

(Tee [A]). The input parameter set E is also found to be most similar to the parameter set D stored in the execution history (e.g., among parameter sets A, D, and B) associated with the cached query plan obtained with the parameter set C. Thus, the second estimated execution time for executing the parameterized query with the input parameter set E (using the cached query plan obtained with the parameter set C) is 1035 ($T_{exe}^D[C]$). Likewise, the input parameter set E is found to be most similar to the parameter set C stored in the execution history (e.g., among parameter sets A, B, and C) associated with the cached query plan obtained with the parameter set B. Thus, the third estimated execution time for executing the parameterized query with the input parameter set E (using the cached query plan obtained with the parameter set B) is 1060 ($T_{exe}^C[B]$).

Among the three estimated execution times 1020 ($T_{exe}^C[A]$), 1035 ($T_{exe}^D[C]$) and 1060 ($T_{exe}^C[B]$), the second one 1035 ($T_{exe}^D[C]$) is the smallest. As described above, the estimated cache gain can then be calculated as $T_{com+exe}^C - T_{exe}^D[C]$, which is negative in this example. Thus, none of the cached query plans can be reused. Instead, the parameterized query with input parameter E will be compiled and executed, with a compilation-plus-execution time 1070. The counter for non-beneficial cases will be incremented.

The similar process can continue for the parameterized query with other input parameter sets to determine whether to reuse any one of the cached query plans or compiling-and-executing the parameterized query with a new query plan, and whether any of the cached query plans needs to be replaced.

Example Advantages

A number of advantages can be achieved via the technologies described herein.

First, the runtime parameterized query management system disclosed herein makes it possible to automatically determine, during runtime, whether to reuse one of the cached plans or compile a new query plan for a parameterized query. Specifically, a parameterized query can be executed using a cached query plan if, and only if, using the cached query plan would be deemed beneficial (e.g., resulting in a positive cache gain). Otherwise, the cached query plan would not be used to execute the parameterized query. Instead, the parameterized query will be compiled and executed with a new query plan. This innovative approach addresses the challenges posed by the dynamic nature of databases and the unpredictability of parameter values in query execution and helps maintain the performance of the system in the face of changing query patterns.

Second, the runtime parameterized query management system disclosed herein can automatically update the set of cached query plans during runtime. This update is triggered if the current set of cached query plans is frequently found to be non-beneficial for processing a parameterized query, leading to repeated compilations. This automatic update of an inefficient query plan in the plan cache enhances the probability of reusing an updated cached query plan, thereby potentially boosting efficiency and minimizing resource usage over time. Importantly, the decision to update a cached query plan can be made after multiple executions of the parameterized queries. This approach allows for the collection of statistics, such as the counts of beneficial and non-beneficial cases, facilitating more robust decision-making. It can avoid the pitfall of prematurely updating the cached query plan based on a single or a few instances where the cached query plan may not be beneficial for the parameterized query with infrequently occurring input parameter sets.

Further, the technologies described herein provides a novel method to accurately estimate a cache gain for a parameterized query, based on estimation of a compilation-plus-execution time for compiling and executing a parameterized query, as well as an execution time for executing the parameterized query using a cached query plan. Such estimation is based on similarity measurements between an input parameter set of the parameterized query and parameter sets stored in a compilation history and one or more execution histories associated with the parameterized query. Importantly, each compilation history or execution history has a limited size that is sufficient to store a limited number of unique parameter sets (and their corresponding compilation-plus-execution or execution times). By using the similarity measurements (as opposed to relying on exact match), a limited number of parameter sets in the compilation history or execution history can represent numerous variations of the input parameter sets that may be encountered for the parameterized query. As a result, the compilation histories and execution histories may only occupy a small memory or storage space. The smaller size of the compilation histories and execution histories also makes measuring and comparing similarity metrics more efficient timewise and requires fewer computing resources, as compared to saving all possible (or many) variations of the parameter sets. This is especially important for database systems with highly limited environments (e.g., with limited storage space, CPU resources, etc.).

Example Computing Systems

Figure 11:
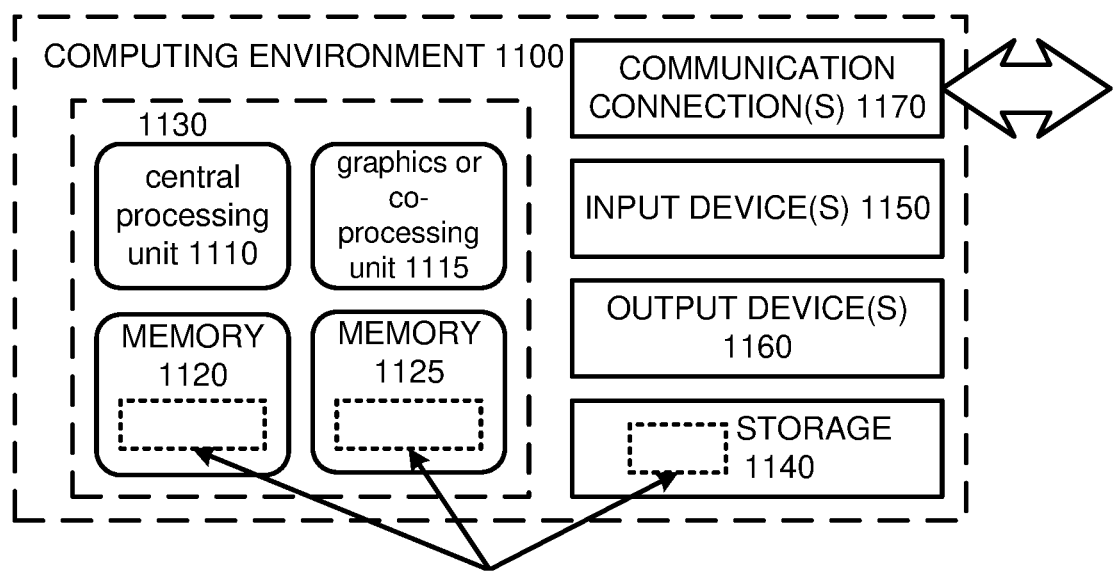
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 can execute computer-executable instructions, such as for implementing the features described in the examples herein (e.g., the method 400, etc.). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 can store software 1180 implementing one or more innovations described herein, in the form of computer-executable instructions suitable for execution by the processing unit(s) 1110, 1115.

A computing system 1100 can have additional features. For example, the computing system 1100 can include storage 1140, one or more input devices 1150, one or more output devices 1160, and one or more communication connections 1170, including input devices, output devices, and communication connections for interacting with a user. An interconnection mechanism (not shown) such as a bus, controller, or network can interconnect the components of the computing system 1100. Typically, operating system software (not shown) can provide an operating environment for other software executing in the computing system 1100, and coordinate activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 can store instructions for the software implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 12:
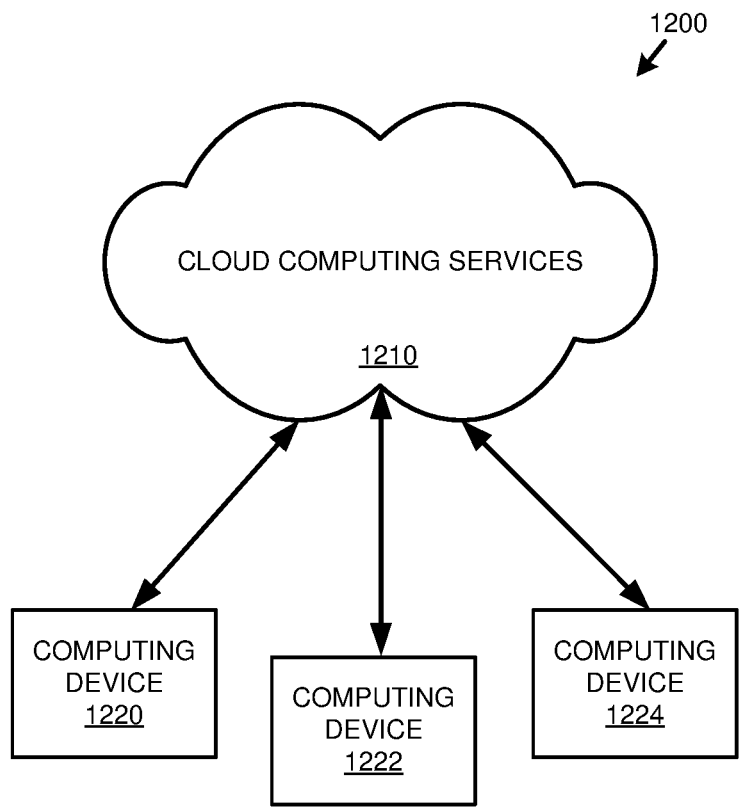
FIG. 12 is a block diagram of an example cloud computing environment that can be used in conjunction with the technologies described herein.

FIG. 12 depicts an example cloud computing environment 1200 in which the described technologies can be implemented, including, e.g., the system 100 and other systems herein. The cloud computing environment 1200 can include cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 can be utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example Embodiments

Any of the following example embodiments can be implemented.

Embodiment 1. A computer-implemented method comprising: receiving a parameterized query with an input parameter set for the parameterized query, wherein the parameterized query has a query plan stored in a plan cache, wherein the parameterized query is associated with a compilation history comprising compilation-plus-execution times for compiling and executing the parameterized query with a first plurality of unique parameter sets, wherein the query plan is associated with an execution history comprising execution times for executing the parameterized query with a second plurality of unique parameter sets by using the query plan; determining an estimated compilation-plus-execution time for compiling and executing the parameterized query with the input parameter set based on the compilation history associated with the parameterized query; determining an estimated execution time for executing the parameterized query with the input parameter set by using the query plan based on the execution history associated with the query plan; determining a cache gain based at least in part on the estimated compilation-plus-execution time and the estimated execution time; responsive to finding that the cache gain is positive, execute the parameterized query with the input parameter set by using the query plan; and responsive to finding the cache gain is not positive, compile and execute the parameterized query with the input parameter set.

Embodiment 2. The method of embodiment 1, further comprising: increasing a first counter responsive to finding that the cache gain is positive; increasing a second counter responsive to finding that the cache gain is not positive; determining a number of executions of the parameterized query since last evaluation of whether the query plan in the plan cache needs to be updated; responsive to finding that the number of executions of the parameterized query since last evaluation reaches a predetermined number, determining a ratio of the first counter to the second counter; responsive to finding that the ratio of the first counter to the second counter is below a predetermined threshold, updating the query plan in the plan cache with a new query plan generated by compilation of the parameterized query with the input parameter set.

Embodiment 3. The method of embodiment 2, further comprising updating the compilation history associated with the parameterized query after updating the query plan in the plan cache, wherein the updating the compilation history comprises: determining a new compilation-plus-execution time for compiling and executing the parameterized query with the input parameter set; determining whether the input parameter set is one of the first plurality of unique parameter sets stored in the compilation history; responsive to finding that the input parameter set is one of the first plurality of unique parameter sets stored in the compilation history, updating the compilation-plus-execution time for compiling and executing the parameterized query with the input parameter set in the compilation history based at least in part on the new compilation-plus-execution time for compiling and executing the parameterized query with the input parameter set; and responsive to finding that the input parameter set is not one of the first plurality of unique parameter sets stored in the compilation history, inserting the new compilation-plus-execution time for compiling and executing the parameterized query with the input parameter set into the compilation history.

Embodiment 4. The method of embodiment 3, wherein the inserting the new compilation-plus-execution time for compiling and executing the parameterized query with the input parameter set into the compilation history comprises: determining a count of the first plurality of unique parameter sets stored in the compilation history; and responsive to finding that the count of the first plurality of unique parameter sets stored in the compilation history is equal to a predefined size of the compilation history, removing the compilation-plus-execution time for compiling and executing the parameterized query with one of the first plurality of unique parameter sets from the compilation history.

Embodiment 5. The method of any one of embodiments 3-4, further comprising updating the execution history associated with the query plan after updating the compilation history associated with the parameterized query, wherein the updating the execution history comprises, in an iterative operation: executing the parameterized query with a new parameter set for the parameterized query using the updated query plan in the plan cache; determining a new execution time for executing the parameterized query with the new parameter set for the parameterized query; determining whether the new parameter set is one of the second plurality of unique parameter sets stored in the execution history; responsive to finding that the new parameter set is one of the second plurality of unique parameter sets stored in the execution history, updating the execution time for executing the parameterized query with the new parameter set in the execution history based at least in part on the new execution time for executing the parameterized query with the new parameter set; and responsive to finding that the new parameter set is not one of the second plurality of unique parameter sets stored in the execution history, inserting the new execution time for executing the parameterized query with the input parameter set into the execution history, wherein the iterative operation continues until a count of the second plurality of unique parameter sets stored in the execution history is equal to a predefined size of the execution history.

Embodiment 6. The method of any one of embodiments 1-5, wherein the determining the estimated compilation-plus-execution time for compiling and executing the parameterized query with the input parameter set comprises: determining one unique parameter set among the first plurality of unique parameter sets stored in the compilation history that is most similar to the input parameter set; and wherein the determining the estimated execution time for executing the parameterized query with the input parameter set by using the query plan comprises: determining one unique parameter set among the second plurality of unique parameter sets stored in the execution history that is most similar to the input parameter set.

Embodiment 7. The method of embodiment 6, wherein the determining one unique parameter set among the first or second plurality of unique parameter sets that is most similar to the input parameter set comprises: measuring distances between the input parameter set and the first or second plurality of unique parameter sets; and identifying a smallest distance among the measured distances.

Embodiment 8. The method of any one of embodiments 6-7, wherein the determining one unique parameter set among the first or second plurality of unique parameter sets that is most similar to the input parameter set comprises: determining a selectivity value of the input parameter set and selectivity values of the first or second plurality of unique parameter sets; and identifying a selectivity value of one of the first or second plurality of unique parameter sets that is closest to the selectivity value of the input parameter set.

Embodiment 9. The method of any one of embodiments 1-8, wherein the query plan is one of multiple query plans for the parameterized query stored in the plan cache, wherein the execution history is one of multiple execution histories respectively associated with the multiple query plans, wherein the estimated execution time is one of multiple estimated execution times respectively determined for the multiple query plans, wherein the cache gain is determined based on comparing the estimated compilation-plus-execution time with the multiple estimated execution times.

Embodiment 10. The method of embodiment 9, wherein the determining the cache gain comprises: determining the smallest estimated execution time among the multiple estimated execution times; and determining a difference between the estimated compilation-plus-execution time and the smallest estimated execution time.

Embodiment 11. A computing system, comprising: memory; one or more hardware processors coupled to the memory; and one or more computer readable storage media storing instructions that, when loaded into the memory, cause the one or more hardware processors to perform operations comprising: receiving a parameterized query with an input parameter set for the parameterized query, wherein the parameterized query has a query plan stored in a plan cache, wherein the parameterized query is associated with a compilation history comprising compilation-plus-execution times for compiling and executing the parameterized query with a first plurality of unique parameter sets, wherein the query plan is associated with an execution history comprising execution times for executing the parameterized query with a second plurality of unique parameter sets by using the query plan; determining an estimated compilation-plus-execution time for compiling and executing the parameterized query with the input parameter set based on the compilation history associated with the parameterized query; determining an estimated execution time for executing the parameterized query with the input parameter set by using the query plan based on the execution history associated with the query plan; determining a cache gain based at least in part on the estimated compilation-plus-execution time and the estimated execution time; responsive to finding that the cache gain is positive, execute the parameterized query with the input parameter set by using the query plan; and responsive to finding the cache gain is not positive, compile and execute the parameterized query with the input parameter set.

Embodiment 12. The system of embodiment 11, wherein the operations further comprise: increasing a first counter responsive to finding that the cache gain is positive; increasing a second counter responsive to finding that the cache gain is not positive; determining a number of executions of the parameterized query since last evaluation of whether the query plan in the plan cache needs to be updated; responsive to finding that the number of executions of the parameterized query since last evaluation reaches a predetermined number, determining a ratio of the first counter to the second counter; responsive to finding that the ratio of the first counter to the second counter is below a predetermined threshold, updating the query plan in the plan cache with a new query plan generated by compilation of the parameterized query with the input parameter set.

Embodiment 13. The system of embodiment 12, wherein the operations further comprise updating the compilation history associated with the parameterized query after updating the query plan in the plan cache, wherein the updating the compilation history comprises: determining a new compilation-plus-execution time for compiling and executing the parameterized query with the input parameter set; determining whether the input parameter set is one of the first plurality of unique parameter sets stored in the compilation history; responsive to finding that the input parameter set is one of the first plurality of unique parameter sets stored in the compilation history, updating the compilation-plus-execution time for compiling and executing the parameterized query with the input parameter set in the compilation history based at least in part on the new compilation-plus-execution time for compiling and executing the parameterized query with the input parameter set; and responsive to finding that the input parameter set is not one of the first plurality of unique parameter sets stored in the compilation history, inserting the new compilation-plus-execution time for compiling and executing the parameterized query with the input parameter set into the compilation history.

Embodiment 14. The system of embodiment 13, wherein the inserting the new compilation-plus-execution time for compiling and executing the parameterized query with the input parameter set into the compilation history comprises: determining a count of the first plurality of unique parameter sets stored in the compilation history; and responsive to finding that the count of the first plurality of unique parameter sets stored in the compilation history is equal to a predefined size of the compilation history, removing the compilation-plus-execution time for compiling and executing the parameterized query with one of the first plurality of unique parameter sets from the compilation history.

Embodiment 15. The system of any one of embodiments 13-14, wherein the operations further comprise updating the execution history associated with the query plan after updating the compilation history associated with the parameterized query, wherein the updating the execution history comprises, in an iterative operation: executing the parameterized query with a new parameter set for the parameterized query using the updated query plan in the plan cache; determining a new execution time for executing the parameterized query with the new parameter set for the parameterized query; determining whether the new parameter set is one of the second plurality of unique parameter sets stored in the execution history; responsive to finding that the new parameter set is one of the second plurality of unique parameter sets stored in the execution history, updating the execution time for executing the parameterized query with the new parameter set in the execution history based at least in part on the new execution time for executing the parameterized query with the new parameter set; and responsive to finding that the new parameter set is not one of the second plurality of unique parameter sets stored in the execution history, inserting the new execution time for executing the parameterized query with the input parameter set into the execution history, wherein the iterative operation continues until a count of the second plurality of unique parameter sets stored in the execution history is equal to a predefined size of the execution history.

Embodiment 16. The system of any one of embodiments 11-15, wherein the determining the estimated compilation-plus-execution time for compiling and executing the parameterized query with the input parameter set comprises: determining one unique parameter set among the first plurality of unique parameter sets stored in the compilation history that is most similar to the input parameter set; and wherein the determining the estimated execution time for executing the parameterized query with the input parameter set by using the query plan comprises: determining one unique parameter set among the second plurality of unique parameter sets stored in the execution history that is most similar to the input parameter set.

Embodiment 17. The system of embodiment 16, wherein the determining one unique parameter set among the first or second plurality of unique parameter sets that is most similar to the input parameter set comprises: measuring distances between the input parameter set and the first or second plurality of unique parameter sets; and identifying a smallest distance among the measured distances.

Embodiment 18. The system of any one of embodiments 16-17, wherein the determining one unique parameter set among the first or second plurality of unique parameter sets that is most similar to the input parameter set comprises: determining a selectivity value of the input parameter set and selectivity values of the first or second plurality of unique parameter sets; and identifying a selectivity value of one of the first or second plurality of unique parameter sets that is closest to the selectivity value of the input parameter set.

Embodiment 19. The system of any one of embodiments 11-18, wherein the query plan is one of multiple query plans for the parameterized query stored in the plan cache, wherein the execution history is one of multiple execution histories respectively associated with the multiple query plans, wherein the estimated execution time is one of multiple estimated execution times respectively determined for the multiple query plans, wherein the determining the cache gain comprises: determining the smallest estimated execution time among the multiple estimated execution times; and determining a difference between the estimated compilation-plus-execution time and the smallest estimated execution time.

Embodiment 20. One or more non-transitory computer-readable media having encoded thereon computer-executable instructions causing one or more processors to perform a method comprising: receiving a parameterized query with an input parameter set for the parameterized query, wherein the parameterized query has a query plan stored in a plan cache, wherein the parameterized query is associated with a compilation history comprising compilation-plus-execution times for compiling and executing the parameterized query with a first plurality of unique parameter sets, wherein the query plan is associated with an execution history comprising execution times for executing the parameterized query with a second plurality of unique parameter sets by using the query plan; determining an estimated compilation-plus-execution time for compiling and executing the parameterized query with the input parameter set based on the compilation history associated with the parameterized query; determining an estimated execution time for executing the parameterized query with the input parameter set by using the query plan based on the execution history associated with the query plan; determining a cache gain, wherein the determining the cache gain comprises calculating a difference between the estimated compilation-plus-execution time and the estimated execution time; responsive to finding that the cache gain is positive, execute the parameterized query with the input parameter set by using the query plan; and responsive to finding the cache gain is not positive, compile and execute the parameterized query with the input parameter set.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for optimizing runtime processing of a parameterized query by automatically selecting between reusing or recompiling a query plan based on dynamic execution conditions, the method comprising:

receiving a parameterized query with an input parameter set for the parameterized query, wherein the parameterized query has a query plan stored in a plan cache, wherein the parameterized query is associated with a compilation history comprising compilation-plus-execution times for compiling and executing the parameterized query with a first plurality of unique parameter sets, wherein the query plan is associated with an execution history comprising execution times for executing the parameterized query with a second plurality of unique parameter sets by using the query plan;

determining an estimated compilation-plus-execution time for compiling and executing the parameterized query with the input parameter set, comprising: determining, in runtime, one unique parameter set among the first plurality of unique parameter sets stored in the compilation history that is most similar to the input parameter set;

determining an estimated execution time for executing the parameterized query with the input parameter set by using the query plan, comprising: determining, in runtime, one unique parameter set among the second plurality of unique parameter sets stored in the execution history that is most similar to the input parameter set;

determining, in runtime, a cache gain based at least in part on the estimated compilation-plus-execution time and the estimated execution time;

responsive to finding that the cache gain is positive, executing the parameterized query with the input parameter set by using the query plan; and responsive to finding the cache gain is not positive, compiling and executing the parameterized query with the input parameter set.

2. The method of claim 1, further comprising:

increasing a first counter responsive to finding that the cache gain is positive;

increasing a second counter responsive to finding that the cache gain is not positive;

determining a number of executions of the parameterized query since last evaluation of whether the query plan in the plan cache needs to be updated;

responsive to finding that the number of executions of the parameterized query since last evaluation reaches a predetermined number, determining, in runtime, a ratio of the first counter to the second counter;

responsive to finding that the ratio of the first counter to the second counter is below a predetermined threshold, updating, in runtime, the query plan in the plan cache with a new query plan generated by compilation of the parameterized query with the input parameter set.

3. The method of claim 2, further comprising updating, in runtime, the compilation history associated with the parameterized query after updating the query plan in the plan cache, wherein the updating the compilation history comprises:

determining a new compilation-plus-execution time for compiling and executing the parameterized query with the input parameter set;

determining whether the input parameter set is one of the first plurality of unique parameter sets stored in the compilation history;

responsive to finding that the input parameter set is one of the first plurality of unique parameter sets stored in the compilation history, updating, in runtime, the compilation-plus-execution time for compiling and executing the parameterized query with the input parameter set in the compilation history based at least in part on the new compilation-plus-execution time for compiling and executing the parameterized query with the input parameter set; and responsive to finding that the input parameter set is not one of the first plurality of unique parameter sets stored in the compilation history, inserting, in runtime, the new compilation-plus-execution time for compiling and executing the parameterized query with the input parameter set into the compilation history.

4. The method of claim 3, wherein the inserting the new compilation-plus-execution time for compiling and executing the parameterized query with the input parameter set into the compilation history comprises:

determining a count of the first plurality of unique parameter sets stored in the compilation history; and responsive to finding that the count of the first plurality of unique parameter sets stored in the compilation history is equal to a predefined size of the compilation history, removing, in runtime, the compilation-plus-execution time for compiling and executing the parameterized query with one of the first plurality of unique parameter sets from the compilation history.

5. The method of claim 3, further comprising updating, in runtime, the execution history associated with the query plan after updating the compilation history associated with the parameterized query, wherein the updating the execution history comprises, in an iterative operation:

executing the parameterized query with a new parameter set for the parameterized query using the updated query plan in the plan cache;

determining a new execution time for executing the parameterized query with the new parameter set for the parameterized query;

determining whether the new parameter set is one of the second plurality of unique parameter sets stored in the execution history;

responsive to finding that the new parameter set is one of the second plurality of unique parameter sets stored in the execution history, updating, in runtime, the execution time for executing the parameterized query with the new parameter set in the execution history based at least in part on the new execution time for executing the parameterized query with the new parameter set; and responsive to finding that the new parameter set is not one of the second plurality of unique parameter sets stored in the execution history, inserting, in runtime, the new execution time for executing the parameterized query with the input parameter set into the execution history, wherein the iterative operation continues until a count of the second plurality of unique parameter sets stored in the execution history is equal to a predefined size of the execution history.

6. The method of claim 1, wherein the determining one unique parameter set among the first or second plurality of unique parameter sets that is most similar to the input parameter set comprises:

measuring, in runtime, distances between the input parameter set and the first or second plurality of unique parameter sets; and identifying, in runtime, a smallest distance among the measured distances.

7. The method of claim 1, wherein the determining one unique parameter set among the first or second plurality of unique parameter sets that is most similar to the input parameter set comprises:

determining, in runtime, a selectivity value of the input parameter set and selectivity values of the first or second plurality of unique parameter sets; and identifying, in runtime, a selectivity value of one of the first or second plurality of unique parameter sets that is closest to the selectivity value of the input parameter set.

8. The method of claim 1, wherein the query plan is one of multiple query plans for the parameterized query stored in the plan cache, wherein the execution history is one of multiple execution histories respectively associated with the multiple query plans, wherein the estimated execution time is one of multiple estimated execution times respectively determined for the multiple query plans, wherein the cache gain is determined based on comparing the estimated compilation-plus-execution time with the multiple estimated execution times.

9. The method of claim 8, wherein the determining the cache gain comprises:

determining, in runtime, the smallest estimated execution time among the multiple estimated execution times; and determining, in runtime, a difference between the estimated compilation-plus-execution time and the smallest estimated execution time.

10. A computing system for optimizing runtime processing of a parameterized query by automatically selecting between reusing or recompiling a query plan based on dynamic execution conditions, the system comprising:

memory;

one or more hardware processors coupled to the memory; and one or more computer readable storage media storing instructions that, when loaded into the memory, cause the one or more hardware processors to perform operations comprising:

receiving a parameterized query with an input parameter set for the parameterized query, wherein the parameterized query has a query plan stored in a plan cache, wherein the parameterized query is associated with a compilation history comprising compilation-plus-execution times for compiling and executing the parameterized query with a first plurality of unique parameter sets, wherein the query plan is associated with an execution history comprising execution times for executing the parameterized query with a second plurality of unique parameter sets by using the query plan;

determining an estimated compilation-plus-execution time for compiling and executing the parameterized query with the input parameter set, comprising: determining, in runtime, one unique parameter set among the first plurality of unique parameter sets stored in the compilation history that is most similar to the input parameter set;

determining an estimated execution time for executing the parameterized query with the input parameter set by using the query plan, comprising: determining, in runtime, one unique parameter set among the second plurality of unique parameter sets stored in the execution history that is most similar to the input parameter set;

determining, in runtime, a cache gain based at least in part on the estimated compilation-plus-execution time and the estimated execution time;
responsive to finding that the cache gain is positive, executing the parameterized query with the input parameter set by using the query plan; and
responsive to finding the cache gain is not positive, compiling and executing the parameterized query with the input parameter set.

11. The system of claim 10, wherein the operations further comprise:
increasing a first counter responsive to finding that the cache gain is positive;
increasing a second counter responsive to finding that the cache gain is not positive;
determining a number of executions of the parameterized query since last evaluation of whether the query plan in the plan cache needs to be updated;
responsive to finding that the number of executions of the parameterized query since last evaluation reaches a predetermined number, determining, in runtime, a ratio of the first counter to the second counter;
responsive to finding that the ratio of the first counter to the second counter is below a predetermined threshold, updating, in runtime, the query plan in the plan cache with a new query plan generated by compilation of the parameterized query with the input parameter set.

12. The system of claim 11, wherein the operations further comprise updating, in runtime, the compilation history associated with the parameterized query after updating the query plan in the plan cache, wherein the updating the compilation history comprises:
determining a new compilation-plus-execution time for compiling and executing the parameterized query with the input parameter set;
determining whether the input parameter set is one of the first plurality of unique parameter sets stored in the compilation history;
responsive to finding that the input parameter set is one of the first plurality of unique parameter sets stored in the compilation history, updating, in runtime, the compilation-plus-execution time for compiling and executing the parameterized query with the input parameter set in the compilation history based at least in part on the new compilation-plus-execution time for compiling and executing the parameterized query with the input parameter set; and
responsive to finding that the input parameter set is not one of the first plurality of unique parameter sets stored in the compilation history, inserting, in runtime, the new compilation-plus-execution time for compiling and executing the parameterized query with the input parameter set into the compilation history.

13. The system of claim 12, wherein inserting the new compilation-plus-execution time for compiling and executing the parameterized query with the input parameter set into the compilation history comprises:
determining a count of the first plurality of unique parameter sets stored in the compilation history; and
responsive to finding that the count of the first plurality of unique parameter sets stored in the compilation history is equal to a predefined size of the compilation history, removing, in runtime, the compilation-plus-execution time for compiling and executing the parameterized query with one of the first plurality of unique parameter sets from the compilation history.

14. The system of claim 12, wherein the operations further comprise updating, in runtime, the execution history associated with the query plan after updating the compilation history associated with the parameterized query, wherein the updating the execution history comprises, in an iterative operation:
executing the parameterized query with a new parameter set for the parameterized query using the updated query plan in the plan cache;
determining a new execution time for executing the parameterized query with the new parameter set for the parameterized query;
determining whether the new parameter set is one of the second plurality of unique parameter sets stored in the execution history;
responsive to finding that the new parameter set is one of the second plurality of unique parameter sets stored in the execution history, updating, in runtime, the execution time for executing the parameterized query with the new parameter set in the execution history based at least in part on the new execution time for executing the parameterized query with the new parameter set; and
responsive to finding that the new parameter set is not one of the second plurality of unique parameter sets stored in the execution history, inserting, in runtime, the new execution time for executing the parameterized query with the input parameter set into the execution history,
wherein the iterative operation continues until a count of the second plurality of unique parameter sets stored in the execution history is equal to a predefined size of the execution history.

15. The system of claim 10, wherein the determining one unique parameter set among the first or second plurality of unique parameter sets that is most similar to the input parameter set comprises:
measuring, in runtime, distances between the input parameter set and the first or second plurality of unique parameter sets; and
identifying, in runtime, a smallest distance among the measured distances.

16. The system of claim 10, wherein the determining one unique parameter set among the first or second plurality of unique parameter sets that is most similar to the input parameter set comprises:
determining, in runtime, a selectivity value of the input parameter set and selectivity values of the first or second plurality of unique parameter sets; and
identifying, in runtime, a selectivity value of one of the first or second plurality of unique parameter sets that is closest to the selectivity value of the input parameter set.

17. The system of claim 10, wherein the query plan is one of multiple query plans for the parameterized query stored in the plan cache, wherein the execution history is one of multiple execution histories respectively associated with the multiple query plans, wherein the estimated execution time is one of multiple estimated execution times respectively determined for the multiple query plans, wherein the determining the cache gain comprises:
determining, in runtime, the smallest estimated execution time among the multiple estimated execution times; and
determining, in runtime, a difference between the estimated compilation-plus-execution time and the smallest estimated execution time.

18. One or more non-transitory computer-readable media having encoded thereon computer-executable instructions causing one or more processors to perform a method for optimizing runtime processing of a parameterized query by automatically selecting between reusing or recompiling a query plan based on dynamic execution conditions, the method comprising:

receiving a parameterized query with an input parameter set for the parameterized query, wherein the parameterized query has a query plan stored in a plan cache, wherein the parameterized query is associated with a compilation history comprising compilation-plus-execution times for compiling and executing the parameterized query with a first plurality of unique parameter sets, wherein the query plan is associated with an execution history comprising execution times for executing the parameterized query with a second plurality of unique parameter sets by using the query plan;

determining an estimated compilation-plus-execution time for compiling and executing the parameterized query with the input parameter set, comprising: determining, in runtime, one unique parameter set among the first plurality of unique parameter sets stored in the compilation history that is most similar to the input parameter set;

determining an estimated execution time for executing the parameterized query with the input parameter set by using the query plan, comprising: determining, in runtime, one unique parameter set among the second plurality of unique parameter sets stored in the execution history that is most similar to the input parameter set;

determining, in runtime, a cache gain based at least in part on the estimated compilation-plus-execution time and the estimated execution time;

responsive to finding that the cache gain is positive, executing the parameterized query with the input parameter set by using the query plan; and responsive to finding the cache gain is not positive, compiling and executing the parameterized query with the input parameter set.

* * * * *